(12) United States Patent
Kono et al.

(10) Patent No.: US 9,130,880 B2
(45) Date of Patent: Sep. 8, 2015

(54) MANAGEMENT SYSTEM AND INFORMATION ACQUISITION METHOD

(75) Inventors: Misako Kono, Kawasaki (JP); Nobuhiro Maki, Yokohama (JP); Wataru Okada, Yokohama (JP); Tsukasa Shibayama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 272 days.

(21) Appl. No.: 13/805,582

(22) PCT Filed: Jul. 11, 2012

(86) PCT No.: PCT/JP2012/067713
§ 371 (c)(1),
(2), (4) Date: Dec. 19, 2012

(87) PCT Pub. No.: WO2014/010047
PCT Pub. Date: Jan. 16, 2014

(65) Prior Publication Data
US 2014/0019620 A1    Jan. 16, 2014

(51) Int. Cl.
*H04L 12/911*   (2013.01)
*G06F 11/30*   (2006.01)
(Continued)

(52) U.S. Cl.
CPC ............ *H04L 47/70* (2013.01); *G06F 11/3034* (2013.01); *G06F 11/3055* (2013.01);
(Continued)

(58) Field of Classification Search
CPC ............ G06F 11/2056; G06F 11/3034; G06F 11/3055; G06F 2201/81; G06F 2201/815; H04L 47/70; H04L 67/1097
See application file for complete search history.

(56) References Cited

U.S. PATENT DOCUMENTS

| | | | |
|---|---|---|---|
| 8,743,712 B1* | 6/2014 | Herzi | 370/252 |
| 2006/0190567 A1* | 8/2006 | Roach | 709/219 |

(Continued)

FOREIGN PATENT DOCUMENTS

| | | | |
|---|---|---|---|
| JP | 2004-355061 A | 12/2004 | |
| JP | 2005-157933 A | 6/2005 | |

(Continued)

OTHER PUBLICATIONS

Written Opinion by ISA (PCT/JP2012/067713) issued on Oct. 2, 2012.

*Primary Examiner* — Brian J Gillis
*Assistant Examiner* — Gil H. Lee
(74) *Attorney, Agent, or Firm* — Mattingly & Malur, PC

(57) ABSTRACT

A management system for managing an acquisition of information on multiple resources by multiple information acquisition apparatuses configured to acquire information on the multiple resources based on an information acquisition indication, is configured. The management system stores information for specifying a resource group, which is a group of multiple resources targeted for acquiring information at the same time points. The management system sends to each of multiple information acquisition apparatuses, which acquire information on multiple resources of a certain resource group, an information acquisition indication defining a timing for acquiring information from the resource of the certain resource group so that the information acquired from the multiple resources of the certain resource group are information at approximately the same time points. The information acquisition apparatus receives the information acquisition indication, and is able to acquire information on the resource of the certain resource group based on this information acquisition indication.

13 Claims, 22 Drawing Sheets

(51) Int. Cl.
    *H04L 29/08*      (2006.01)
    *G06F 11/20*      (2006.01)
(52) U.S. Cl.
    CPC ......... *G06F11/2056* (2013.01); *G06F 2201/81*
            (2013.01); *G06F 2201/815* (2013.01); *H04L*
                                    *67/1097* (2013.01)

(56) References Cited

U.S. PATENT DOCUMENTS

| | | | |
|---|---|---|---|
| 2010/0017466 A1* | 1/2010 | Trauner | 709/203 |
| 2011/0010634 A1* | 1/2011 | Hatasaki et al. | 715/739 |
| 2011/0131323 A1* | 6/2011 | Otsuka et al. | 709/224 |
| 2011/0161483 A1* | 6/2011 | Takemura | 709/223 |
| 2011/0161609 A1* | 6/2011 | Oyamada et al. | 711/162 |
| 2012/0011173 A1* | 1/2012 | Ohata et al. | 707/812 |
| 2012/0137099 A1* | 5/2012 | Shibayama et al. | 711/165 |

FOREIGN PATENT DOCUMENTS

| | | |
|---|---|---|
| JP | 2007-128122 A | 5/2007 |
| JP | 2010-287142 A | 12/2010 |
| JP | 2011-134152 A | 7/2011 |
| WO | 2010/001481 A1 | 1/2010 |
| WO | 2012/026041 A1 | 3/2012 |

* cited by examiner

| Storage ID | Volume ID | Cache ID | CPUID | Attribute | Details | Status | Information collection time point |
|---|---|---|---|---|---|---|---|
| ST_01 | Vol_01 | Cache_0 1 | CPU_0 1 | COPY | Pair1 | Pair | 2012/05/20 16:01:00:01 |
| | Vol_02 | Cache_0 1 | CPU_0 1 | COPY | Pair1 Pair2 | Pair | 2012/05/20 16:01:00:03 |
| | Vol_03 | Cache_0 4 | CPU_0 1 | JNL-VOL | JNL_01 | 60% | 2012/05/20 16:05:00:00 |
| | Vol_04 | Cache_0 1 | CPU_0 1 | Enclosure virtualization technology | | In use | 2012/05/20 16:10:00:00 |
| | Vol_05 | Cache_0 2 | CPU_0 2 | HDT-VOL | | 50% | 2012/05/20 16:11:00:00 |
| | ... | | | | ... | | |
| ST_02 | Vol_01 | Cache_0 1 | CPU_0 1 | COPY | Pair2 Pair3 | Pair | 2012/05/20 16:01:00:01 |
| | Vol_02 | Cache_0 1 | CPU_0 1 | COPY | Pair3 | Suspended | 2012/05/20 16:01:00:01 |
| | Vol_03 | Cache_0 4 | CPU_0 2 | JNL_VOL | JNL_01 | 20% | 2012/05/20 16:01:00:01 |
| | ... | | | | ... | | |

Fig. 6

| Copy pair ID | Data 702 | | 704 | Target 705 | | 707 | Attribute | Status | Information collection time point |
|---|---|---|---|---|---|---|---|---|---|
| | Storage ID | Volume ID | Journal volume ID | Storage ID | Volume ID | Journal volume ID | | | |
| Pair1 | ST_01 | Vol_01 | - | ST_01 | Vol_02 | - | Local copy | Pair | 2012/05/20 16:01:00:01 |
| Pair2 | ST_01 | Vol_02 | JNL_01 | ST_02 | Vol_01 | JNL_01 | Remote copy | Pair | 2012/05/20 16:01:00:03 |
| Pair3 | ST_02 | Vol_01 | - | ST_02 | Vol_02 | JNL_02 | Local copy | Suspended | 2012/05/20 16:01:00:01 |
| ... | ... | ... | ... | ... | ... | ... | ... | ... | ... |

Fig. 7

| Virtual storage ID | Virtual 802 | | Physical 804 | | Status | Information collection time point |
|---|---|---|---|---|---|---|
| | Storage ID | Volume ID 803 | Storage ID | Volume ID 805 | 806 | 807 |
| H-UVM1 | VDKC_01 | VVol_01 | ST_01 | Vol_03 | In use | 2012/05/20 16:10:00:00 |
| | | VVol_02 | ST_02 | Vol_04 | In use | 2012/05/20 16:10:00:01 |
| | | VVol_03 | ST_02 | Vol_05 | — | |
| H-UVM2 | VDKC_02 | VVol_01 | ST_01 | Vol_06 | In use | 2012/05/20 16:21:00:00 |
| | | VVol_02 | ST_01 | Vol_07 | — | |
| ... | ... | ... | ... | ... | | |

| 901 | 902 | 903 | 904 | 905 |
|---|---|---|---|---|
| Information collection ID | Target | Information acquisition interval | Latest information acquisition start time point | Next information acquisition start time point |
| Mon_01 | ST_01 ST_02 | Four hours | 2012/05/20 12:00 | 2012/05/20 16:00 |
| ... | ... | ... | ... | ... |

Fig. 9

| Management computer ID (2201) | Management target ID (2202) |
|---|---|
| MS_01 | ST_01 |
|  | Pair_01 |
|  | Pair_02 |
|  | ... |
| MS_02 | ST_02 |
|  | ST_03 |
|  | Pair_03 |
|  | SW_01 |
|  | Host_01 |
|  | ... |

Fig. 22

MANAGEMENT SYSTEM AND INFORMATION ACQUISITION METHOD

TECHNICAL FIELD

The present invention relates to technology for acquiring information related to multiple resources existing in a computer system.

BACKGROUND ART

The amounts of data managed by companies are increasing sharply in line with the progress of the information society. Consequently, computer systems, which couple together host computers and storage apparatuses via switches and hubs, for example, computer systems, which make use of a SAN (Storage Area Network) to enable flexible data management, are widely used. The increase in companies specializing in the provision and management of IT systems to ordinary companies in recent years has resulted in the consolidation of data in the computer systems possessed by these specialized companies providing and managing IT systems. Thus, computer systems are becoming increasingly larger in size. This increase in the size of the computer system is also increasing the number of objects (for example, the number of volumes provided by a storage apparatus) handled by management software for managing these computer systems.

From the standpoint of managing a computer system, performance monitoring is important for the normal operation of the computer system. The management software is able to integratively manage the operating status and operational performance of resources comprising a computer system by collecting performance information from agents disposed in multiple management targets. The rise in the number of resources being managed is also increasing the amount of performance information to be acquired by the management software, thus requiring the processing of large amounts of performance information. PTL 1 discloses a method, which, based on information acquired by the management software, automatically adjusts the subsequent targeted range and acquisition frequency for acquiring performance information.

CITATION LIST

Patent Literature

[PTL 1]
Japanese Patent Application Laid-Open No. 2005-157933

SUMMARY OF INVENTION

Technical Problem

In order to discern the state of a computer system in a normal way, there are cases where a computer system administrator wants to reference information at the same timing along with the inter-resource relationships and event relationships. The collection of a large amount of information in a large-scale environment takes time even when the frequency of information collection is adjusted or the management instances (management software) for collecting the information are increased. Thus, in a case where information should be referenced at the same timing, there is the possibility of deviations occurring in the acquisition time points of the contents of the respective information. For example, when it takes one hour to collect the information of volumes of a storage apparatus in a computer system in volume ID order, a deviation of approximately one hour occurs between the acquisition time points of the volume information acquired first and the volume information acquired last.

In a case where the collection of resource information spans multiple pieces of management software, differences will occur in the acquisition time points of the acquired information due to the fact that each piece of management software acquires information independently without regard to the related resources. In addition, the time it takes to acquire information will differ in accordance with the various types of management-target equipment, the levels of performance thereof, and the number of resources in the management-target equipment, making it impossible to match up the timings at which the respective information is acquired.

A computer system will be explained here being a disaster recovery configuration as an example. It is supposed that various types of apparatuses are disposed at multiple sites in the computer system, and that a computer (management computer) for executing management software is provided at each site. For example, in order for the administrator to accurately discern a state of a copy pair, the management software must display same-time-point status information for a related copy pair together. For example, it is supposed that there is a "Pair 1" for copying data from a primary storage to a secondary storage, and a "Pair 2" for copying data on the secondary storage side to acquire a backup of this data. In accordance with this, there is a relationship between "Pair 1" and "Pair 2", and the administrator must perform operations while keeping an eye on the states of both pairs. When management software A acquires the information of "Pair 1", and management software B acquires the information of "Pair 2" independently thereof, for example, the information of "Pair 1" could be acquired at 8:30, whereas the information of "Pair 2" is acquired at 9:00. In a case such as this, when the state of "Pair 1" changes during the 30 minutes between 8:30 and 9:00, the administrator is unable to accurately discern the state of the copy pair. Thus, there is a risk that the administrator will perform an operation based on an incorrect determination resulting from incorrect information (for example, status information).

Solution to Problem

A management system, which manages an acquisition of information on multiple resources by multiple information acquisition apparatuses configured to acquire information on the multiple resources based on an information acquisition indication, is configured. The management system stores information for specifying a resource group, which is a group of multiple resources targeted for acquiring information at the same time point. The management system sends to each of multiple information acquisition apparatuses, which acquire information on multiple resources of a certain resource group, an information acquisition indication defining a timing for acquiring information from the resource of the certain resource group so that the information acquired from the multiple resources of the certain resource group are information at approximately the same time points. The information acquisition apparatus receives the information acquisition indication, and based on this information acquisition indication, is able to acquire the resource information of the certain resource group.

Advantageous Effects of Invention

The present invention makes it possible to properly discern the states of multiple resources in a computer system.

BRIEF DESCRIPTION OF DRAWINGS

FIG. 1 is a block diagram of an example of a computer system related to Example 1.

FIG. 2 is a block diagram of an example of a storage subsystem related to Example 1.

FIG. 3 is a block diagram of an example of a host computer related to Example 1.

FIG. 4 is a block diagram of an example of a management computer related to Example 1.

FIG. 5 is a block diagram of an example of a switch related to Example 1.

[FIG. 6]

FIG. 6 is a diagram showing an example of a configuration information table related to Example 1.

[FIG. 7]

FIG. 7 is a diagram showing an example of a copy pair configuration information table related to Example 1.

[Fig. 8]

FIG. 8 is a diagram showing an example of a storage virtualization configuration information table related to Example 1.

[FIG. 9]

FIG. 9 is a diagram showing an example of an information acquisition schedule table related to Example 1.

FIG. 10 is a diagram showing an example of an information acquisition policy table related to Example 1.

FIG. 11 is a flowchart showing an example of an information acquisition process related to Example 1.

FIG. 12 is a flowchart showing an example of an information collection setting information acquisition process related to Example 1.

FIG. 13 is a diagram showing an example of an information collection setting screen related to Example 1.

FIG. 14 is a sequence diagram showing an example of an information acquisition indication process related to Example 1.

FIG. 15 is a flowchart showing an example of a time point check and correction process related to Example 1.

FIG. 16 is a diagram showing an example of a warning screen related to Example 1.

[FIG. 17]

FIG. 18 is a diagram showing another example of a configuration information table related to Example 1.

FIG. 19 is a sequence diagram showing an example of an information acquisition indication process related to Example 2.

FIG. 20 is a sequence diagram showing an example of an information acquisition indication process related to Example 3.

FIG. 21 is a diagram showing an example of an information collection setting screen related to Example 3.

[FIG. 22]

FIG. 22 is a diagram showing an example of a management target table related to Example 1.

DESCRIPTION OF EMBODIMENTS

Figure 1:
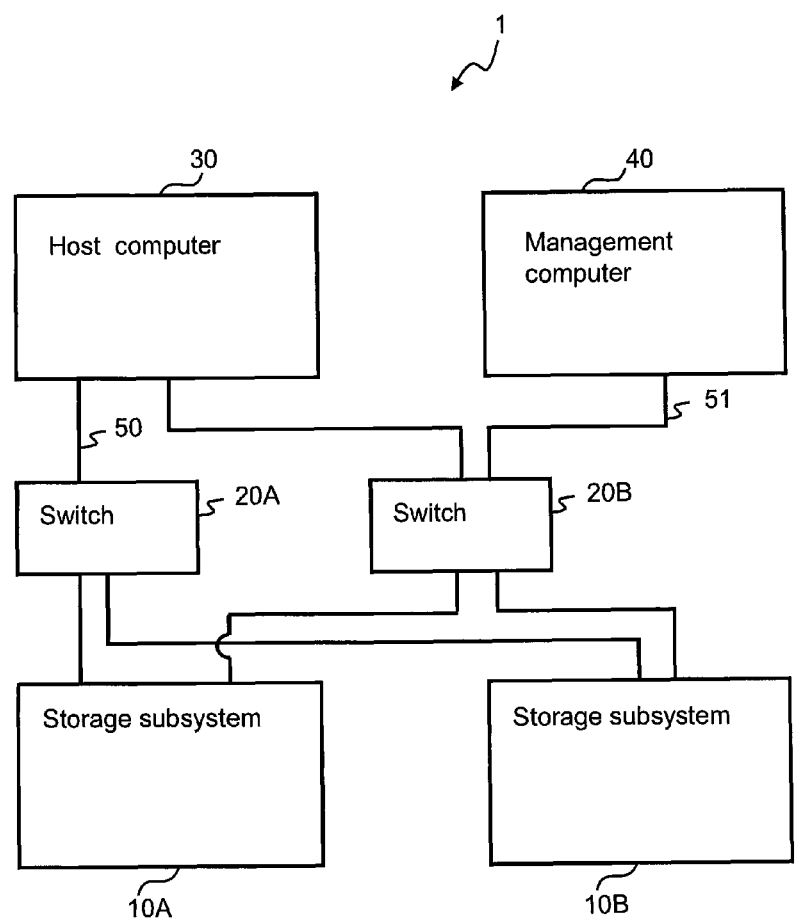
[FIG. 1]

A number of examples will be explained by referring to the drawings. The examples explained below do not limit the invention of the claims, and not all of the elements and combinations thereof explained in the examples are essential to the invention as means for solving the problem.

In the following explanation, information is explained using expressions such as "aaa table", but this information may also be expressed using a data structure other than a table. Therefore, to show that this information is not dependent on the data structure, "aaa table" may be called "aaa information".

When explaining the content of the respective information, the expression "ID" is used, but this expression is interchangeable with the expressions "identification information", "identifier", and "name".

In the following explanation, there may be cases where an explanation is given using a "program" as the doer of the action, but since the stipulated processing is performed in accordance with a program (computer program) executed by a processor (typically, a CPU (Central Processing Unit)) while using a memory and an I/F (interface), the explanation may also have the processor as the doer of the action. A process, which is disclosed as having the program as the doer of the action, may be regarded as a process performed by a computer, such as a host computer or a management computer, or a storage subsystem. Furthermore, either all or a portion of a program may be realized in accordance with dedicated hardware. Various types of programs may be installed in a computer from a program distribution server or computer readable storage media. The storage media, for example, may include an IC card, a SD card, a DVD, and the like.

A set of one or more computers, which manage the computer system and display information for display purposes, may be called a management system. In a case where the management computer displays the display information, the management computer is the management system. Also, a combination of the management computer and a display computer may also be the management system. Furthermore, the similar processing to that of the management computer may be realized using multiple computers for increasing the speed and enhancing the reliability of the management processes, and in this case, the relevant multiple computers (may include a display computer in a case where a display computer performs a display) are the management system.

EXAMPLE 1

Example 1 will be explained.

A computer system related to Example 1 includes a host computer 30, a storage subsystem 10 (10A, 10B), a switch (20A, 20B), and a management computer 40.

The management computer adjusts the timing of information acquisition with respect to a set of multiple resources (a resource group: for example, a set of multiple resources, which are associated with one another) for which it is preferable that information be acquired at approximately the same time period (either simultaneously or within a limited time range), and instructs multiple information collection apparatuses (for example, the management computer 40, the storage subsystem 10, the switch 20, and the host computer 30, and so forth) which acquire the resource information to acquire the resource information. As used here, a resource may be an apparatus, which exists in the computer system, a physical configuration in an apparatus, and a logical configuration in an apparatus. This makes it possible for the management computer to appropriately acquire resource group information at approximately the same time period even in a case where the computer system is a large-scale configuration. The resource group may be defined in terms of related information, such as related information of the storage subsystem 10, that is, a copy pair configuration, and a virtual DKC (disk controller) configuration, which uses enclosure virtualization technology to enable multiple storage subsystems 10 to be handled virtually as a single storage subsystem. This makes it possible for the administrator of the storage subsystem to appropriately acquire required information. The resource group may also be regarded in terms of a consistency group, which brings together not only the related information of the storage subsystem 10 but also resources related to applications aimed at a higher-level administrator than the storage subsystem 10 administrator, for example, an applications administrator or a business administrator. The consistency group includes a switch, which is connected from an application, and a storage subsystem resource.

This example, for example, controls the timing of an information acquisition indication for a resource group, which is regarded as a target for acquiring information at approximately the same time period from among management-target resources in a process for polling at fixed periods as in normal monitoring and collecting information on management-target resources. For example, any of the management computers 40 adjusts the timing of the information acquisition indication sent to an information collection apparatus, the information acquisition apparatus receives the information acquisition indication, and acquires the information of the corresponding resource. This makes it possible to appropriately acquire management-target resource information at each fixed time period.

FIG. 1 is a block diagram of an example of a computer systems related to Example 1.

The computer system 1 includes storage subsystems 10A and 10B, switches 20A and 20B, a host computer 30, and a management computer 40. The storage subsystems 10A and 10B, the switch 20A, and the host computer 30 are coupled together via respective data interfaces and a data network 50. The data network 50, for example, may be a SAN (Storage Area Network), an IP network, or any other type of data communication network.

The storage subsystems 10A and 10B, the switch 20B, the host computer 30, and the management computer 40 are coupled together via respective data interfaces and a management network 51. The management network 51, for example, may be an IP network, a SAN, or any other type of network. The data network 50 and the management network 51 may be the same network.

The host computer 30 and the management computer 40 may be computers having the same hardware configuration.

The computer system 1 shown in FIG. 1 shows an example, which includes two storage subsystems 10A and 10B, two switches 20A and 20B, one host computer 30, and one management computer 40, but the number of various types of computers and storage subsystems 10 comprising the computer system 1 is not limited thereto.

In this example, for example, it is supposed that the storage subsystems 10A and 10B are the same configuration. In a case where neither of the storage subsystems 10A and 10B is specified, the storage subsystem will be referred to as the storage subsystem 10.

In the following explanation of this example, the computer system 1 will be explained as a system comprised from apparatuses at multiple sites. That is, it is supposed that the computer system 1 has at each site a management computer 40 for managing the site, and that each of these management computers 40 manages multiple host computers 30 and multiple storage subsystems 10 at the site where it itself belongs. The same site may be equipped with multiple management computers 40.

Thus, in a case where multiple management computers 40 exist in the computer system 1, multiple information collection management programs, which will be explained further below, will be run in the computer system 1. Here, an information collection management program, which supervises multiple information collection management programs, may be called a main information collection management program, and an information collection management program, which receives an indication from the main information collection management program, may be called an information collection management sub-program. A management computer which executes the main information collection management program may be called a main management computer. The computer system 1 may be equipped with one management computer, and there may be one information collection management program in the computer system 1.

Figure 2:
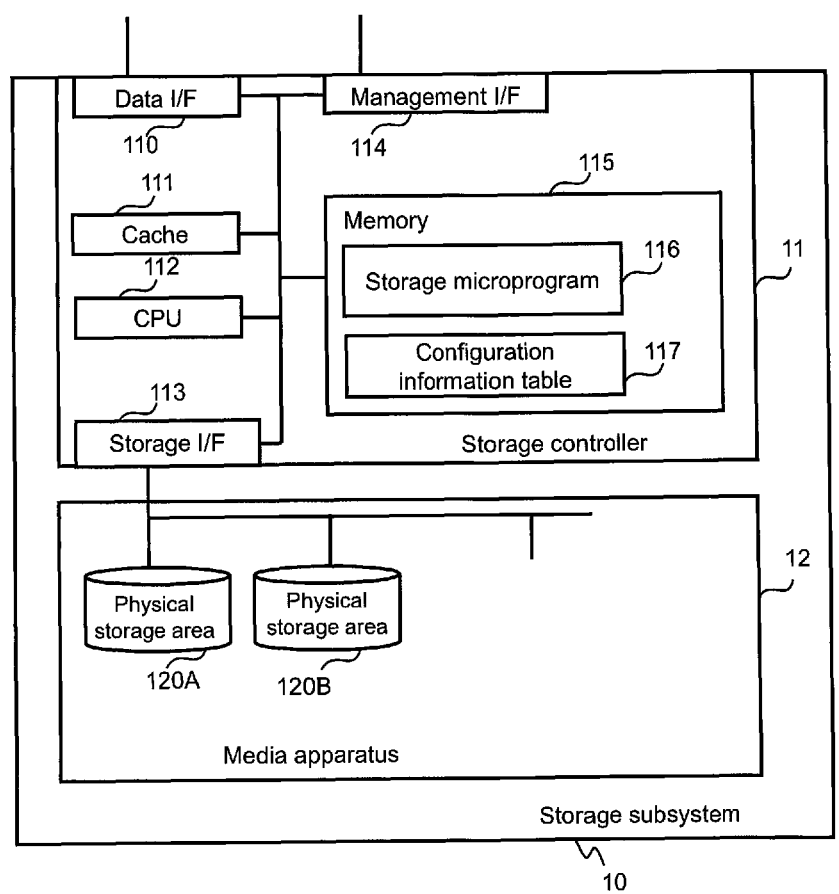
[FIG. 2]

FIG. 2 is a block diagram of an example of a storage subsystem related to Example 1.

The storage subsystem 10 is equipped with a storage controller 11 for controlling to entire storage subsystem 10, and a media apparatus 12 for storing data. The storage controller 11 and the media apparatus 12 are coupled via an internal bus.

The storage controller 11 includes a data interface (I/F) 110, a cache 111, a CPU (Central Processing Unit) 112, a storage I/F 113, a management I/F 114, and a memory 115.

The data I/F 110 is an interface for coupling to the data network 50, and includes one or more communication ports. The storage controller 11 sends/receives data to/from the host computer 30 via this communication port. The cache 111 is a storage area for temporarily storing data. The cache 111, for example, temporarily stores data sent from the host computer 30 prior to storing this data in the media apparatus 12 to enhance the performance of the storage subsystem. 10. The CPU 112 executes various types of processing in accordance with executing a program stored in the memory 115. The storage I/F 113 is an interface for coupling to the media apparatus 12. The storage controller 11 sends/receives data and control instructions to/from the media apparatus 12 via the storage I/F 113.

The management I/F 114 is an interface for coupling to the management network 51, and includes one or more communication ports. The storage controller 11 sends/receives data and control instructions to/from the host computer 30, the management computer 40, and other storage subsystem 10 via this communication port. The memory 115 is a main storage device, and stores various types of information and a program, which is executed by the CPU 112. The memory 115, for example, stores a storage microprogram 116, and a configuration information table 117. The microprogram 116 stored in the memory 115 and the data used in the microprogram 116 are typically loaded from either the media apparatus 12 or a storage area of another nonvolatile storage device.

The storage microprogram 116 is for managing the storage subsystem 10. For example, the storage microprogram 116 has a function for allowing the host computer 30 to recognize a volume. For example, the storage microprogram 116 provides a physical storage area of the media apparatus 12 to the host computer 30 as one or more volumes. The storage microprogram 116 also has a function for copying data in a volume to another volume in accordance with setting data. For example, in a case where it is supposed that physical storage areas 120A and 120B in the storage subsystem 10 each comprise one volume, the storage microprogram 116 copies data from the physical storage area 120A to the physical storage area 120B. The storage microprogram 116 also has a function for virtualizing the ID of the storage subsystem itself, and for virtualizing a volume. The configuration information table 117 stores information with respect to the configuration of the storage subsystem 10.

The media apparatus 12 includes one or more physical storage areas 120 (120A, 120B). Here, in a case where neither of physical storage areas 120A and 120B is specified, the physical storage area will be referred to as physical storage area 120. The physical storage area 120 is an example of a resource. The physical storage area 120 is a real storage area for storing data used by the host computer 30. The physical storage area 120 is a physical storage area provided by a physical device, such as a HDD (Hard Disk Drive) or a SSD (Solid State Drive). For example, the physical storage area 120 may be a physical storage area of a RAID (Redundant Array of Independent Disks) comprised from multiple storage media. In FIG. 2, there are two physical storage areas 120A and 120B in the media apparatus 12, but the number of physical storage areas on the storage subsystem 10 is arbitrary.

Figure 3:
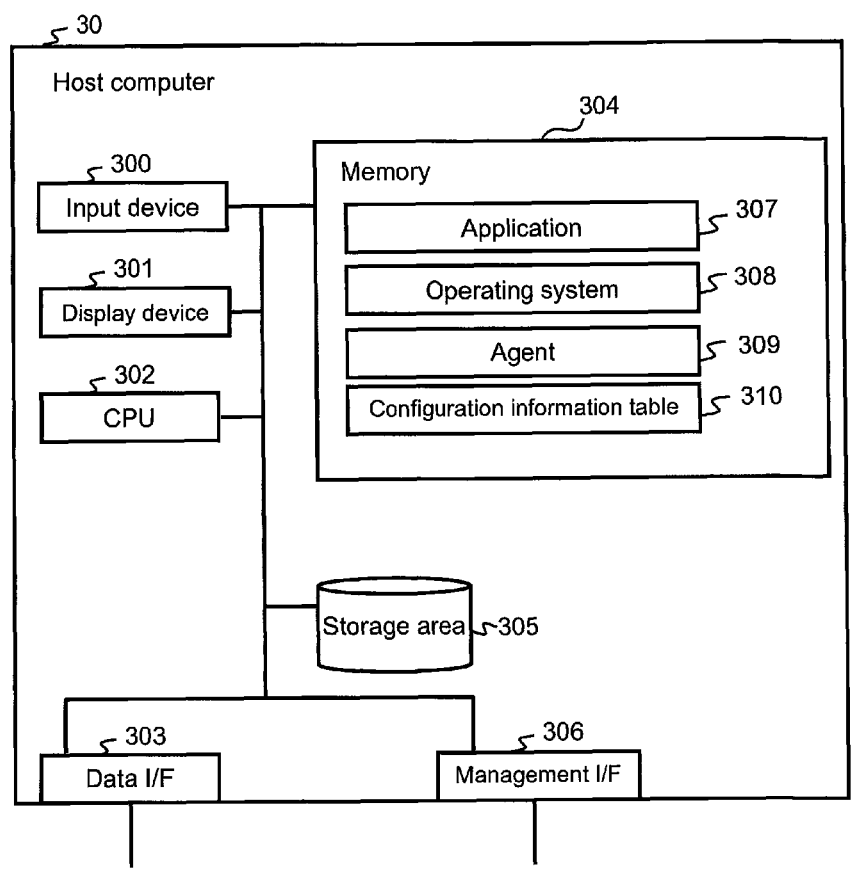
[FIG. 3]

FIG. 3 is a block diagram of an example of a host computer related to Example 1.

The host computer 30 is equipped with an input device 300, a display device 301, a CPU 302, a data I/F 303, a memory 304, a storage area 305, and a management I/F 306.

The input device 300 is a device, which receives input from a user, and typically is a keyboard and a pointer device, but may be a different device from these devices. The display device 301 is a device, which displays various types of information, and typically is a LCD (Liquid Crystal Display). The user uses these input devices 300 and display device 301 to perform an operation with respect to the host computer 30. The CPU 302 executes various types of processing in accordance with executing programs stored in the memory 304. The data I/F 303 is an interface for coupling to the data network 50, and includes one or more communication ports. The host computer 30 sends/receives data to/from the storage subsystems 10A and 10B via this communication port. The memory 304 is a main storage device. The memory 304 stores an application 307, an operating system (OS) 308, an agent 309, and a configuration information table 310. The memory 304 may be configured to store multiple applications. The application 307, the OS 308, and the agent 309 are executed by the CPU 302. The program stored in the memory 304, data used by the program, and the table are typically loaded into the memory 304 from the storage area 305.

The OS 308 is basic software, which runs on the host computer 30 and manages the entire computer. The application 307 is a program which runs on the OS 308 and executes a service. The application 307, for example, executes processing, which accompanies the reading/writing of data from/to the physical storage area 120 of the storage subsystem 10. The application 307, for example, is an electronic mail server program or a database management program. The storage subsystem 10 provides the application 307 with either one or multiple volumes. The agent 309 has a function for acquiring information from the host computer 30, the OS 308, the application 307, and the storage subsystem 10 (10A, 10B), and notifying the management computer 40 of the information. The configuration information table 310 stores information with respect to a configuration related to the host computer 30.

The storage area 305 is a storage area of a secondary storage device having a nonvolatile storage medium, and stores a program and data needed for realizing a prescribed function. The secondary device comprising the storage area 305 may be an external storage device coupled via a network. The management I/F 306 is an interface for coupling to the management network 51, and performs the sending and receiving of data and control instructions for system management between the storage subsystems 10A, 10B and the management computer 40.

Figure 4:
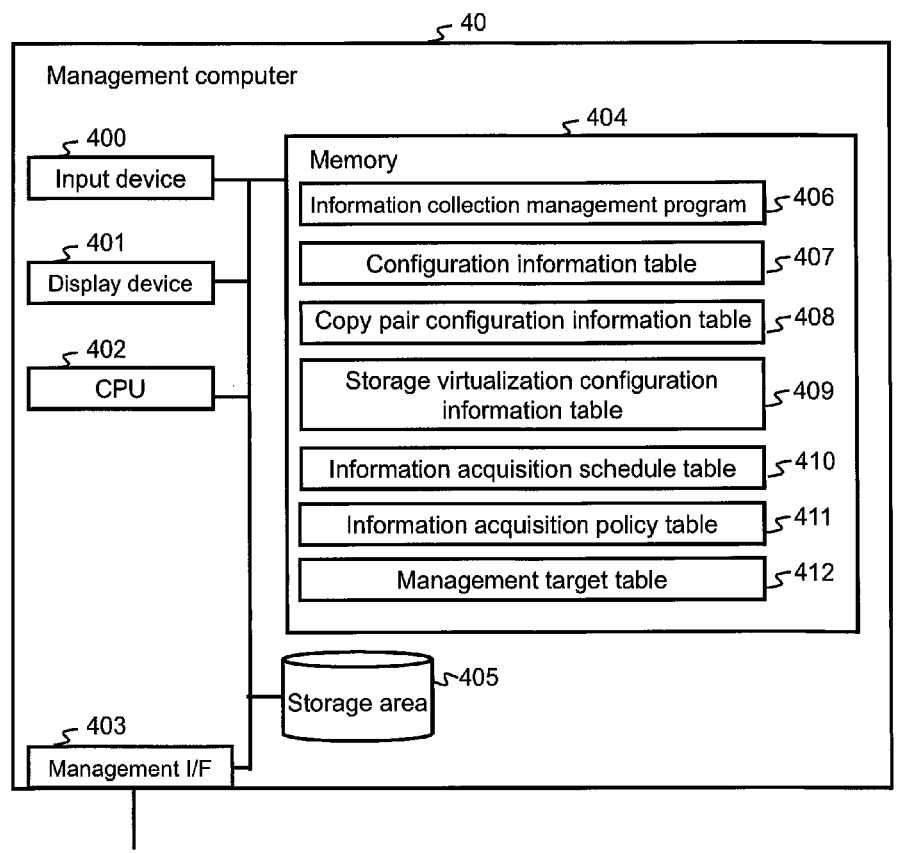
[FIG.4]

FIG. 4 is a block diagram of an example of a management computer related to Example 1.

The management computer 40 is equipped with an input device 400, a display device 401, a communication interface device (for example, a management I/F 403), a storage device (for example, a memory 404 and a storage area 405), and a control device (for example, a CPU 402) coupled thereto.

The input device 400 is a device, which receives input from an administrator (user), and typically is a keyboard and a pointer device, but may be a different device from these devices. The display device 401 is a device, which displays various types of information, and typically is a LCD (Liquid Crystal Display). The user uses the input device 400 to input various types of information into the management computer 40 while viewing the processing result displayed on the display device 401. The information inputted by the administrator using the input device 400 and an example of a display screen in accordance with the display device 401 will be explained further below.

In the computer system 1, a management system comprises one management computer 40, but a management console, which provides a user interface, may be included in the management system. The management console has a display device and an input device. The management console accesses the management computer 40, instructs the management computer 40 to perform processing according to an administrator input via the input device, and, in addition, acquires the processing result of the management computer 40 and displays this result on the display device. The management system may comprise multiple computers equipped with either all or part of the functions of the management computer 40.

The CPU 402 executes various types of processing in accordance with executing a program stored in the memory 404. The management I/F 403 is an interface for coupling to the management network 51, and performs the sending and receiving of data and control instructions for system management among the host computer 30, other management computer 40, and the storage subsystem 10.

The memory 404 stores an information collection management program 406, a configuration information table 407, a copy pair configuration information table 408, a storage virtualization configuration information table 409, an information acquisition schedule table 410, an information acquisition policy table 411, and a management target table 412. The program and tables in the memory 404 are loaded into the memory 404 from the storage area 405.

The information collection management program 406 realizes various types of processing by being executed by the CPU 402. The information collection management program 406 performs processing for displaying a screen on the display device 401, processing for setting and controlling information acquisition for acquiring information from the host computer 30, the switch 20, the storage subsystem 10, and other management computer 40, and processing for managing the respective tables. The configuration information table 407, the copy pair configuration information table 408, the storage virtualization configuration information table 409, the information acquisition schedule table 410, the information acquisition policy table 411, and the management target table 412 will be explained further below.

The storage area 405 is a storage area of a secondary storage device having a nonvolatile storage medium. The secondary storage device comprising the storage area 405 may be an external storage device coupled via a network.

Figure 5:
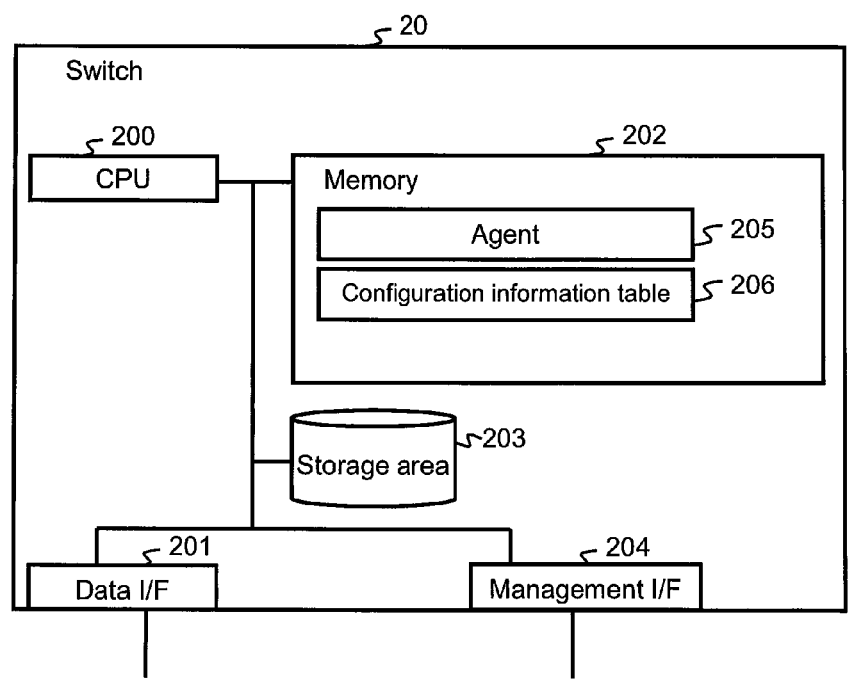
[FIG. 5]

FIG. 5 is a block diagram of an example of a switch related to Example 1.

The switch 20 (20A, 20B) is equipped with a CPU 200, a data I/F 201, a memory 202, a storage area 203, and a management I/F 204. In a case where neither of the switches 20A and 20B is specified here, the switch will be referred to as the switch 20.

The CPU 200 executes various types of processing in accordance with executing a program stored in the memory 202. The data I/F 201 is an interface for coupling to the data network 50, and includes one or more communication ports. The host computer 30 and storage subsystem 10 send and receive data via this communication port. The memory 202 is a main storage device. The memory 202 stores an agent 205 and a configuration information table 206. The program stored in the memory 202, data used by the program, and the table are typically loaded into the memory 202 from the storage area 203. The agent 205 is a program possessing a function for acquiring switch 20 information, and notifying the management computer 40 of this information. The configuration information table 206 stores information regarding a configuration related to the switch 20.

The storage area 203 is a storage area of a secondary storage device having a nonvolatile storage medium, and stores a program and data needed for realizing a prescribed function. The management I/F 204 is an interface for coupling to the management network 51, and performs the sending and receiving of data and control instructions for system management between the storage subsystem 10 and the management computer 40.

Next, the tables related to this example will be explained.

FIG. 6 is a diagram showing an example of a configuration information table related to Example 1.

The configuration information table 407 is for storing information on the logical configuration (volume configuration) of the storage subsystems 10A, 10B. The configuration information table 407 is referenced by the information collection management program 406 executed on the management computer 40.

The configuration information table 407 has columns (fields) of a storage ID 601, a volume ID 602, a cache ID 603, a CPU ID 604, an attribute 605, details 606, a status 607, and an information collection point time 608 in each entry.

A storage ID for identifying a storage subsystem 10 is stored in the storage ID 601. A volume ID for identifying a volume is stored in the volume ID 602. A cache ID for identifying a cache related to data in a volume corresponding to the volume ID of the volume ID 602 in the same entry is stored in the cache ID 603. A CPU ID for identifying the CPU related to a volume corresponding to the volume ID of the volume ID 602 in the same entry, that is, the CPU, which handles this volume, is stored in the CPU ID 604. The attribute of a volume corresponding to the same entry is stored in the attribute 605. The volume attributes include "COPY", which shows that the volume is either a copy source or a copy destination, "JNL-VOL", which shows that the volume is for storing a journal, and "enclosure virtualization technology", which shows that the volume has been virtualized using the enclosure virtualization technology. Detailed information regarding an attribute in the attribute 605 of the same entry is stored in details 606. For example, the ID of a copy pair in a copy, or the ID of a journal volume is stored as the detailed information regarding the attribute. Information on the status of a volume corresponding to the same entry is stored in the status 607. A time point (information collection time point) at which status information and so forth was acquired for the same entry is stored in the information collection time point 608. The information collection time point, for example, is the time point at which the management computer 40 acquired information from a management target. In a case where the management computer 40 is able to acquire a time point for a management target when acquiring information from the management target, this time point may be the information collection time point. However, the premise in this case is that a time point management server exists, and there is no difference in time points between management targets. In this example, it is supposed that the respective management targets are located in the same time zone, that is, there is no time difference between the respective management targets. In a case where the time zones in which management targets are located differ, the time-difference deviation between the time points may be corrected. For example, in a case where location A is three hours earlier than location B due to a time difference, Jun. 19, 2012 15:00 at location A is the same time point as Jun. 19, 2012 18:00 at location B, and as such, the time point may be corrected to the point time of either location and used.

The respective information of the configuration information table 407, for example, is stored by the information collection management program 406. The information collection management program 406 acquires needed information from storage microprogram 116 of the storage subsystems 10A, 10B. Information inputted by the administrator using the input device 400 may be stored as at least a portion of the information of the configuration information table 407. In this example, the main information collection management program 406 of the main management computer 40 receives from multiple management computers 40, which collect information from the storage subsystem 10, the information collected by these management computers 40, and stores this information in the configuration information table 407 as shown in FIG. 6.

FIG. 22 is a diagram showing an example of a management target table related to Example 1.

The management target table 412 is for managing a management-target apparatus (for example, the storage subsystem 10, the switch 20, the host computer 30, and so forth) in accordance with the information collection program 406 of the management computer 40.

The management target table 412 has columns of management computer ID 2201, and a management target ID 2202 in each entry.

A management computer ID for specifying a management computer is stored in the management computer ID 2201. A management target ID for an apparatus targeted for management by the management computer 40 corresponding to the entry is stored in the management target ID 2202. The management target ID, for example, may be a storage ID, or may be an ID for identifying a host computer 30 or a switch 20. The management target ID need not be an apparatus ID, and, for example, may be the ID of either a physical or logical configuration in an apparatus, for example, a copy pair ID or a virtual storage ID.

Each value in the management target table 412 may be configured manually by the administrator, or may be registered by the information collection management program 406 which figures out a management target based on an IP address or the like. The management collection management program 406 may automatically allocate the management targets managed by each management computer 40 based on the connections between the resources or the performance information of the management computer 40.

FIG. 7 is a diagram showing an example of a copy pair configuration information table related to Example 1.

The copy pair configuration information table 408 is for managing copy pair configuration information in the storage subsystem 10. The copy pair configuration information table 408 is referenced by the information collection management program 406 executed on the management computer 40.

The copy pair configuration information table 408 has columns (fields) of a copy pair ID 701, a storage ID 702, a volume ID 703, a journal volume ID 704, a storage ID 705, a volume ID 706, a journal volume ID 707, an attribute 708, a status 709, and an information collection time point 710 in each entry. Each entry shows the configuration information of one copy pair. In a case where there is another related resource required in the copy pair, another column may be added to the entry.

A copy pair ID for identifying a copy pair is stored in the copy pair ID 701. A storage ID of the storage subsystem 10 for storing a primary volume, which is a data volume, is stored in the storage ID 702. A volume ID of the primary volume, which is a data volume, is stored in the volume ID 703. A volume ID of a volume (journal volume) for storing a journal related to the primary volume is stored in the journal volume ID 704. In a case where a journal volume is not used as the copy pair configuration, for example, "-" is configured in the journal volume ID 704, but the value in the journal volume ID 704 is not limited to this notation.

A storage ID of the storage subsystem 10 for storing a secondary volume, which is a backup target, is stored in the storage ID 705. A volume ID of the secondary volume is stored in the volume ID 706. A volume ID of a journal volume related to the secondary volume is stored in the journal volume ID 707. In a case where a journal volume is not used as the copy pair configuration, for example, "-" is configured in the journal volume ID 707, but the value in the journal volume ID 707 is not limited to this notation.

An attribute for identifying a copy type is stored in the attribute 708. In a case where the copy type is a local copy in the attribute 708, "local copy" is configured, and in a case where the copy type is a remote copy, "remote copy" is configured. The values configured in the attribute 708 are not limited thereto, and, for example, "local snapshot", or the name of a copy function may be stored as long as the value is capable to specifying a copy type.

A copy status is stored in the status 709. The status is information, which can change over time. In a case where a state in which the copy pair is being maintained is shown in the status 709, for example, "pair" is configured, and in a case where the maintenance of the copy pair has been suspended, "suspended" is configured. A time point (information collection time point) at which the information in the entry was collected is stored in the information collection time point 710. The information collection time point is the same as the information collection time point stored in the information collection time point 608 of the configuration information table 407.

The information of the copy pair configuration information table 408 is stored by the information collection management program 406. The information collection management program 406 acquires the required information from the storage microprogram 116 of the storage subsystems 10A, 10B. Information inputted by the administrator using the input device 400 may be stored as at least a portion of the information of the copy pair configuration information table 408.

FIG. 8 is a diagram showing an example of a storage virtualization configuration information table related to Example 1.

The storage virtualization configuration information table 409 is for managing a configuration, which uses a virtualization function for a storage or volume of the storage subsystem 10. The storage virtualization configuration information table 409 is referenced by the information collection management program 406 executed on the management computer 40.

The storage virtualization configuration information table 409 has columns of a virtual storage ID 801, a storage ID 802, a volume ID 803, a storage ID 804, a volume ID 805, a status 806, and an information collection time point 807 in each entry.

A virtual storage ID for identifying a virtualized storage subsystem (virtual storage subsystem) is stored in the virtual storage ID 801. A storage ID of a virtual storage subsystem, which is managed at a lower level than the virtual storage subsystem shown by the virtual storage ID in the virtual storage ID 801, is stored in the storage ID 802. A volume ID of a virtual volume in the virtual storage subsystem of the storage ID in the storage ID 802 is stored in the volume ID 803. A storage ID of the storage subsystem 10, which constitutes the basis of the virtual storage subsystem of the storage ID in the storage ID 802, is stored in the storage ID 804. A volume ID of a physical volume, which constitutes the basis of the virtual volume of the volume ID in the volume ID 803, is stored in the volume ID 805. The state of the physical volume shown by the volume ID in the volume ID 805 is stored in the status 806. In the status 806, for example, "in use" is configured when the physical volume shown by the volume ID in the volume ID 805 is being used, and "-" is configured when this physical volume is not being used. A time point (information collection time point) at which the information in the entry was acquired is stored in the information collection time point 807. The information collection time point is the same as the information collection time point stored in the information collection time point 608 of the configuration information table 407.

The information of the storage virtualization configuration information table 409, for example, is stored by the information collection management program 406. The information collection management program 406 acquires the required information from the storage microprogram 116 of the storage subsystems 10A, 10B. Information inputted by the administrator using the input device 400 may be stored as at least a portion of the information of the storage virtualization configuration information table 409.

FIG. 9 is a diagram showing an example of an information acquisition schedule table related to Example 1.

The information acquisition schedule table 410 is for managing a schedule related to the acquisition of information by the storage subsystem 10 and the logical configuration of the computer system 1. The information acquisition schedule table 410, for example, is stored by the information collection management program 406.

The information acquisition schedule table 410 has columns of an information collection ID 901, a target 902, an information acquisition interval 903, a latest information acquisition start time point 904, and a next information acquisition start time point 905 in each entry.

An information collection ID for identifying a group scheduled for information collection is stored in the information collection ID 901. Identification information for identifying an information acquisition target is stored in the target 902. Either a value inputted by the administrator or a default value may be configured in the target 902. An interval for acquiring information (information acquisition interval) is stored in the information acquisition interval 903. Either an interval or a time point, such as, for example, "daily at 23:00", may be configured in the information acquisition interval 903. Furthermore, either a value inputted by the administrator or a default value may be configured in the information acquisition interval 903. A time point at which the latest information acquisition started is stored in the latest information acquisition start time point 904. The information collection management program 406 configures the time point at which the program was executed in the latest information acquisition start time point 904.

A time point at which the next information acquisition will be started is stored in the next information acquisition start time point 905. The information collection management program 406 calculates the next information acquisition start time point based on the information acquisition interval in the information acquisition interval 903 and the latest information acquisition start time point in the latest information acquisition start time point 904 at the start of program execution, and stores this result in the next information acquisition start time point 905. In the example shown in FIG. 9, since the latest information acquisition start time point 904 is "12:00", the "four hours" of the information acquisition interval 903 is added, the next information acquisition start time point is calculated as "16:00", and "16:00" is stored in the next information acquisition start time point 905.

Figure 10:
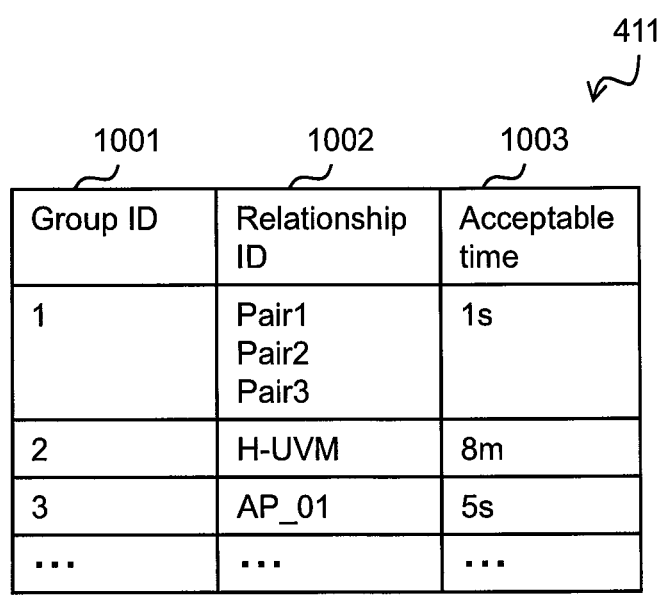
[FIG. 10]

FIG. 10 is a diagram showing an example of an information acquisition policy table related to Example 1.

The information acquisition policy table 411 is for managing a policy related to the acquisition of information by the storage subsystem 10 and the logical configuration of the computer system 1. The respective information of the information acquisition policy table 411 is stored by the information collection management program 406.

The information acquisition policy table 411 has columns of a group ID 1001, a relationship ID 1002, and an acceptable time 1003 in each entry.

A group ID for identifying a resource group is stored in the group ID 1001. The resource group is a group of resources for which it is preferable to acquire information at approximately the same time points. An ID (relationship ID) for identifying a resource, which belongs to the resource group, is stored in the relationship ID 1002. For example, a copy pair ID 701 and a virtual storage ID are stored in the relationship ID 1002. The relationship ID may include the IDs of related resource, or the IDs of resources grouped together by the user. A time (acceptable time), which is acceptable with respect to the deviations between the time points at which information related to the respective resources in the resource group was acquired, is stored in the acceptable time 1003. An acceptable time inputted by the administrator or a default time may be configured in the acceptable time 1003.

For example, according to the first entry of the information acquisition policy table 411 shown in FIG. 10, a resource group, which has the group ID "1", comprises the resources "Pair 1", "Pair 2", and "Pair 3", and the information regarding these resources must be acquired at a deviation of one second or less.

Next, the processing operations in the computer system related to Example 1 will be explained.

Figure 11:
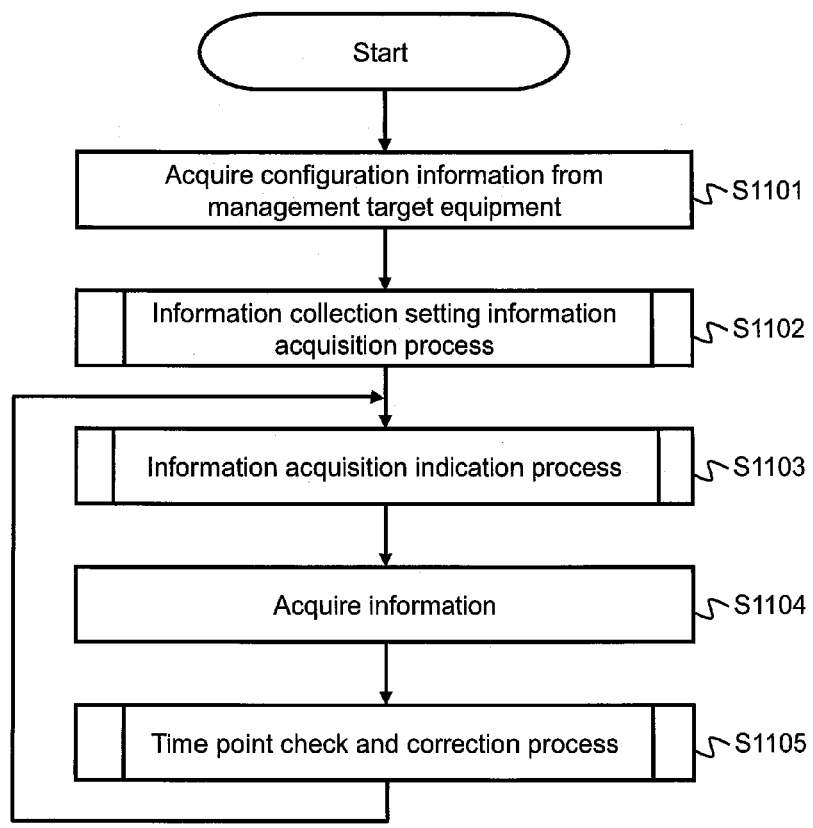
[FIG. 11]

FIG. 11 is a flowchart showing an example of an information acquisition process related to Example 1.

The information acquisition process is executed in accordance with the CPU 402 of the management computer 40 executing the information collection management program 406.

The information collection management program 406 acquires from management-target equipment (for example, the host computer 30, the storage subsystems 10A and 10B, and so forth) the logical configuration information of this equipment (for example, the configuration information of data stored in this equipment) (Step S1101). The information collection management program 406 stores the acquired configuration information in the configuration information table 407, the copy pair configuration information table 408, and the storage virtualization configuration information table 409. For example, the information collection management program 406 acquires the volume configuration information in the host computer 30 and the storage subsystems 10A, 10B, and stores this information in the configuration information table 407.

Next, the information collection management program 406 executes an information collection setting information acquisition process (refer to FIG. 12) (Step S1102). In the information collection setting information acquisition process, the information collection management program 406 acquires the resource group, which is the target for acquiring information at approximately the same time points, and an acceptable time, which is acceptable as the deviation between the acquisition time points of the resource information of this resource group.

Next, the information collection management program 406, based on the information acquisition schedule table 410 and the information acquisition policy table 411, executes an information acquisition indication process (refer to FIG. 14) for controlling the timing at which information acquisition indications are sent (Step S1103). In accordance with the information acquisition indication process, the management computer 40 (specifically, the information collection management sub-program 406 of the management computer 40) acquires the resource information from the management-target apparatus.

Next, the information collection management program 406 acquires the resource information acquired by the controlled information acquisition apparatus in accordance with the information acquisition indication process of Step S1103, and information on the acquisition time points (acquisition time point information) at which the resource information was acquired (Step S1104).

Next, the information collection management program 406, based on the acquisition time point information acquired in Step S1104, executes a time point check and correction process (refer to FIG. 15) (Step S1105), and advances the processing to Step S1103. That is, the information collection management program 406 once again collects information subsequent to Step S1105. The information collection management program 406 may end the flow shown in FIG. 11 in a case where information collection has been canceled.

Figure 12:
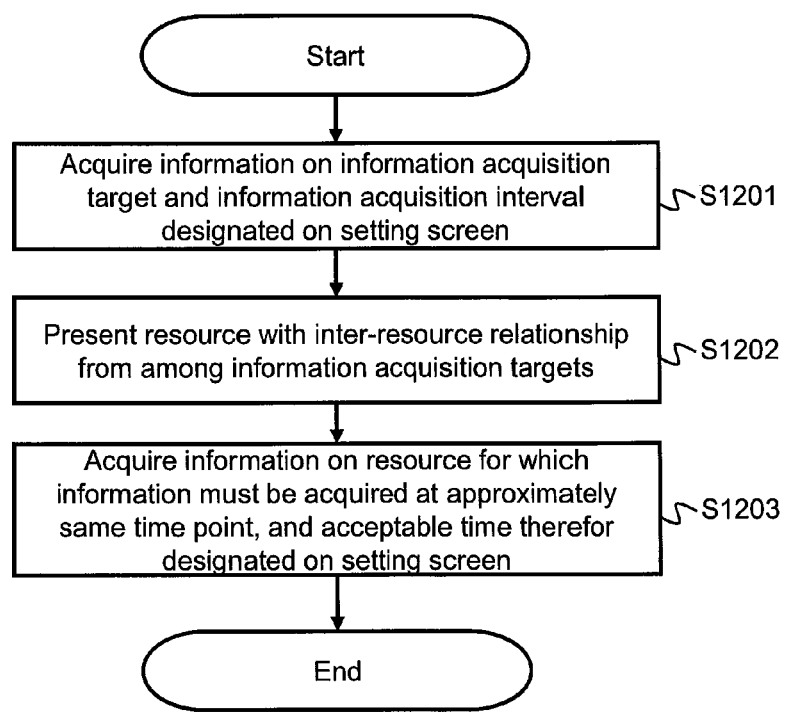
[FIG. 12]

FIG. 12 is a flowchart showing an example of an information collection setting information acquisition process related to Example 1.

The information collection setting information acquisition process is executed in accordance with the CPU 402 of the management computer 40 executing the information collection management program 406.

The information collection management program 406 displays an information acquisition target setting screen not shown in the drawings on the display device 401, acquires information of the target for acquiring information (information acquisition target), which has been designated by the administrator on the information acquisition target setting screen, and of the time interval for acquiring the information (information acquisition interval), and stores this information in the information acquisition schedule table 410 (Step S1201).

Next, the information collection management program 406, based on the configuration information table 407, specifies resources possessing an inter-resource relationship from among the resources belonging to the information acquisition target acquired in Step S1201, and presents this resources on the information collection setting screen (refer to FIG. 13) (Step S1202).

Next, the information collection management program 406 acquires multiple resources, which have been designated on the information collection setting screen by the administrator as targets for acquiring information at approximately the same time points, and information on an acceptable time, which is acceptable as the deviation between acquisition time points of these resources, and configures this information in the information collection policy table 411 (Step S1203).

A user interface for the information acquisition target setting screen displayed in Step S1201 and the information collection setting screen displayed in Step S1203 may be a GUI (Graphical User Interface) for realizing graphical screen operations, or a CLI (Command Line Interface) for realizing command-based inputs. As a method for configuring information in the information acquisition schedule table 410 and the information collection policy table 411, the information collection management program 406 may configure this information by referencing an administrator-created property file without relying on an input to the screen by the administrator, or the information collection management program 406 may automatically configure this information based on a defined algorithm.

Figure 13:
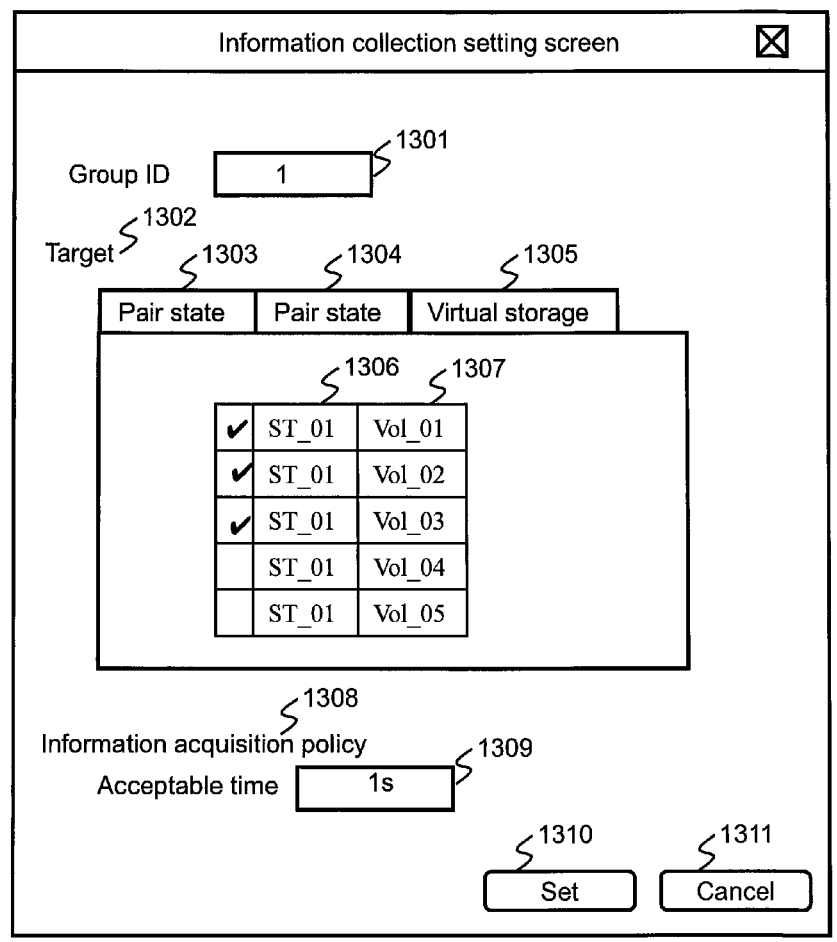
[FIG. 13]

FIG. 13 is a diagram showing an example of an information collection setting screen related to Example 1.

The information collection setting screen related to this example includes a group ID display field 1301 for displaying a group ID showing the resource group for which information will be acquired at approximately the same time points, a target designation area 1302 for designating a resource group target, an information acquisition policy designation area 1308 for designating a policy related to the acquiring of information with respect to the resource group, a set button 1310, and a cancel button 1311.

The target designation area 1302 includes a pair state display tab 1303, which displays a related-pair resource of a local copy, a pair state display tab 1304, which displays a related-pair resource of a remote copy, and a virtual storage display tab 1305, which displays related resources in a virtual storage. In the example shown in FIG. 13, the pair state display tab 1303 is selected, and a list of volumes, which are the related-pair resources of a local copy, is displayed in this display area.

In the example of FIG. 13, the list of volumes includes a storage ID display area 1306 for displaying the storage ID of the storage subsystem 10 storing a volume, a volume ID display area 1307 for displaying the ID of the volume, and a checkbox for designating whether or not this volume has been selected as part of a resource group. The administrator is able to select volumes, which will be regarded as the same resource group, by using the input device 400 to click on the checkboxes. Volumes for which a selection mark has been configured in the checkboxes show that these selected volumes belong to the same resource group, that is, are resources, which are targets for acquiring information at approximately the same time points. The administrator can select resources for which information at approximately the same time points are required by selecting the checkboxes, and can acquire information at approximately same time points for these resources in accordance with a process, which will be explained further below.

The information acquisition policy setting area 1308 is for configuring a policy related to the acquisition of information with respect to a resource group. In the example of FIG. 13, the information acquisition policy setting area 1308 includes an acceptable time setting area 1309 for configuring a policy for a time (acceptable time), which is acceptable as a deviation between the information acquisition times when acquiring information related to the resources of the resource group. The acceptable time configured in the acceptable time setting area 1309 is stored in the information acquisition policy table 411. The policy shown in FIG. 13 is an example, and the policy included in the information acquisition policy is dependent on the design. The administrator need not configure an information collection policy for the resource group. It may also be supposed that a resource group for which an information collection policy is not configured shows that all of the resources collect information at the same time point.

The set button 1310 is the button, which is pressed when the contents configured in the information collection setting screen have been finalized. When the set button 1310 is pressed, the information collection management program 406 finalizes the settings, which have been inputted to the information collection setting screen, acquires the contents inputted to the information collection setting screen, and reflects these contents in the information acquisition policy table 411. The cancel button 1311 is the button, which is pressed when canceling the contents configured in the information collection setting screen. When the cancel button 1311 is pressed, the information collection management program 406 ends the information collection setting information acquisition process without acquiring the contents configured in the information collection setting screen.

The example of the information collection setting screen shown in FIG. 13 shows a state in which the information of the copy pairs related to the volumes "Vol_01", "Vol_02", and "Vol_03" have been configured so as to acquire information at a deviation of one second or less.

Figure 14:
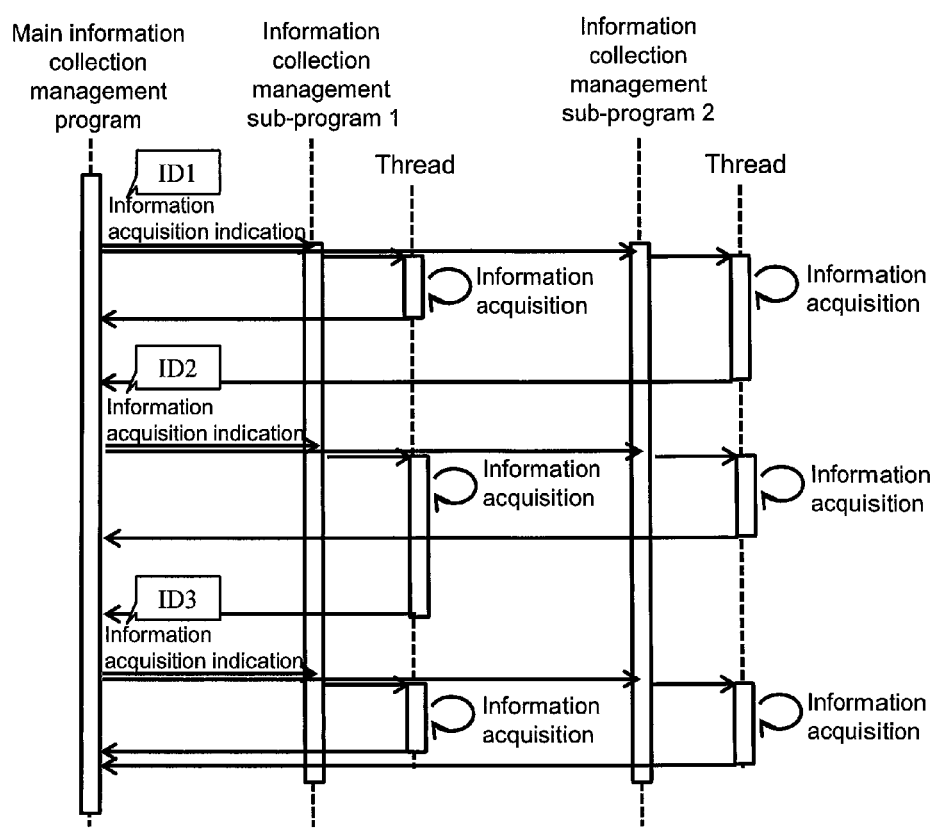
[FIG. 14]

FIG. 14 is a sequence diagram showing an example of an information acquisition indication process related to Example 1.

Execution of the information acquisition indication process is started by the main information acquisition management program 406 when the time point has reached the next information acquisition start time point 905 in the information acquisition schedule table 410.

The main information acquisition management program 406 specifies a resource group from the information acquisition policy table 411. For example, the main information acquisition management program 406 specifies that the resource group for which the group ID 901 in the information acquisition policy table 411 is "1" is "Pair 1", "Pair 2", and "Pair 3" from the relationship ID 902.

In addition, since this information is copy pair information, the main information acquisition management program 406 specifies the volume ID of a volume related to a copy pair by referencing the volume ID 703 of the entry in which the copy pair ID 701 of the copy pair configuration information table 408 is "Pair 1", "Pair 2", and "Pair 3". For example, the fact that the volume "Vol_01" is related to the copy pair "Pair 1" can be specified here. In addition, the main information acquisition management program 406 specifies the entry, which includes "Pair_01" in the management target ID 2202 of the management target table 412, and from the management computer ID 2201 of the relevant entry, specifies that the ID of the management computer 40, which is managing the volume of the copy pair "Pair_01", is "MS_01". Similarly, the main information acquisition management program 406 also specifies that the management computer 40, which is managing the volume of the copy pair "Pair 3" is "MS_02".

In this example, it is possible to specify that the management computers 40 "MS_01" and "MS_02" are the information collection apparatuses, which will collect the information. Here, the main information acquisition management program 406 may be the information acquisition management program 406 of the management computer 40 "MS_01", the information acquisition management program 406 of the management computer 40 "MS_02", or the information acquisition management program 406 of another management computer 40 besides these management computers 40 "MS_01" and "MS_02".

The main information collection management program 406 sends indications (information acquisition indications) for acquiring the information of multiple resources belonging to one resource group to the specified management computers 40. The timing at which the main information collection management program 406 sends the information acquisition indications to the management computers 40 here is the timing which has been configured for each of the management computers 40. Furthermore, in the initial state, the timing at which the main information collection management program 406 sends the information acquisition indications to the management computers 40 is approximately the same timing, but in a case where the timing has been corrected in Step S1105, it is this corrected timing.

When the main information collection management program 406 sends the information acquisition indication like this, the management computers 40 acquire the information of the resource corresponding to the information acquisition indication. When acquiring the resource information here, a thread for the information collection management sub-program 406 to acquire the resource information is created in each management computer 40, and the relevant thread is executed by the CPU 402. Multiple threads may be created when acquiring the information of multiple resources. Thereafter, each management computer 40 sends the acquired resource information to the main information collection management program 406. Thereafter, in Step S1104 shown in FIG. 11, the main information collection management program 406 receives the acquired information from the management computers 40, stores this information in the status (607, 709, and 806) of the configuration information table 407, the copy pair configuration information table 408, and the storage virtualization configuration information table 409, and, in addition, stores the information acquisition time points sent from the management computers 40 in the information collection time point (608, 710, 807) of the respective tables (407, 408, 409).

Then, after acquiring the respective resource information of the one resource group, the main information collection management program 406 executes the same processing by making the next resource group the target. Thus, the main information collection management program 406 executes the same processing for all the resource groups registered in the information acquisition policy table 411. Since the information of multiple resources in the respective resource groups is collectively acquired like this, it can be made that the time points at which the information of the resources in the same resource group was acquired are relatively close time points.

The management computers 40 may arbitrarily perform information collection during free time with respect to resources to which group IDs have not been assigned. Since there is no rule with respect to the time points at which information is acquired from these resources, there is no need to perform the same processing as that described hereinabove for acquiring information from a resource group.

In the example shown in FIG. 14, the management computers 40 send the acquired information to the main information collection management program 406 immediately after the information has been collected, but the present invention is not limited to this, and, for example, immediately after acquiring the information, the management computers 40 may send only an information acquisition notification showing that the information has been acquired without notifying the main information collection management program 406 of acquired information, and, in addition, the management computers 40 may retain the acquired information and send the acquired information to the main information collection management program 406 afterwards.

Figure 15:
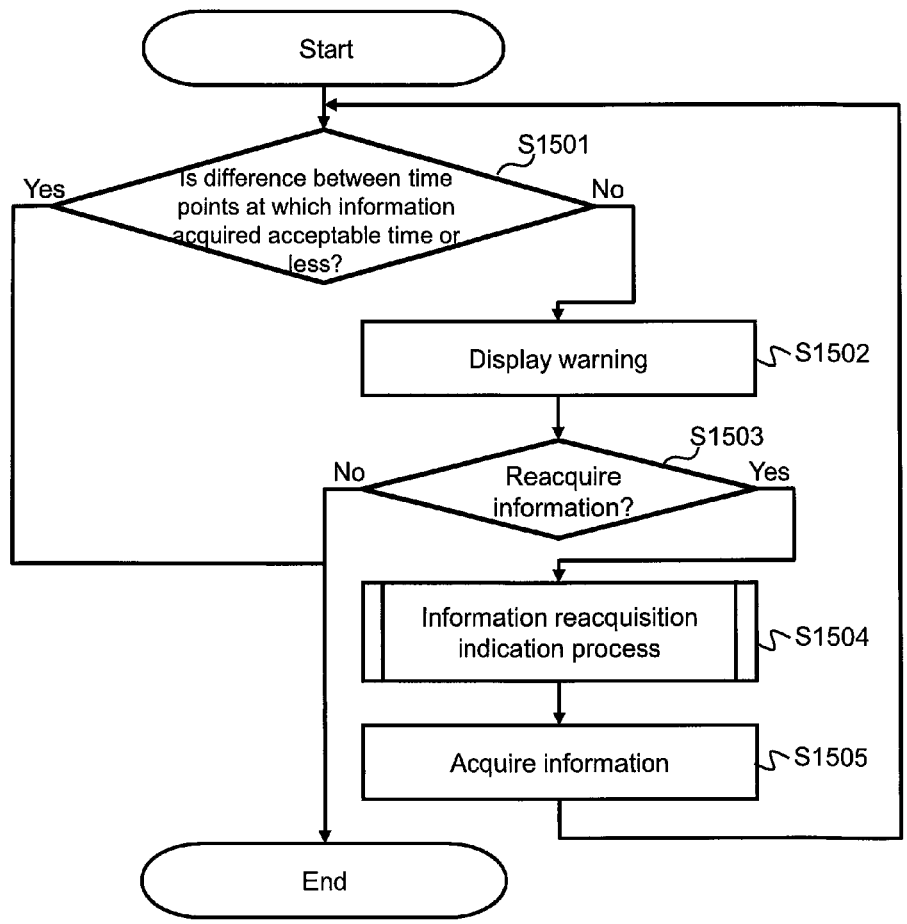
[FIG. 15]
Figure 16:
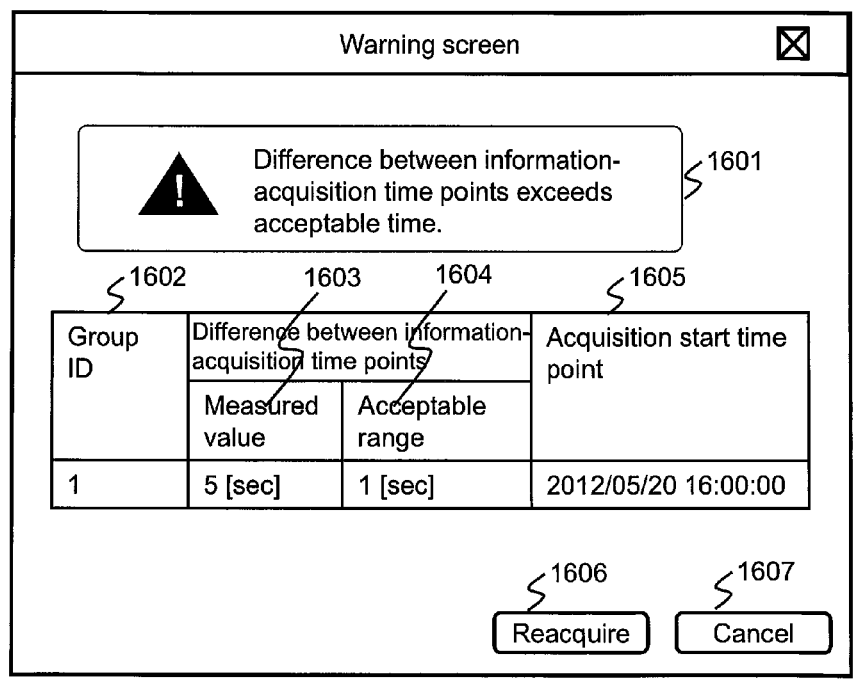
[FIG. 16]

FIG. 15 is a flowchart showing an example of a time point check and correction process related to Example 1. FIG. 16 is a diagram showing an example of a warning screen related to Example 1.

The time point check and correction process is executed in Step S1105 of the information acquisition process of FIG. 11. The time point check and correction process is executed in accordance with the CPU 402 of the management computer 40 executing the information collection management program 406.

The information collection management program 406, based on the information acquisition time point, which is the time point at which the respective resource information acquired in S1104 was acquired, and the acceptable time of the information acquisition policy table 411, determines whether or not a difference in the information acquisition time points at which the information of the resources in the same resource group was acquired is the acceptable time or less (S1501). For example, according to the information acquisition policy table 411, in the resource group for which the group ID is "1", the information of "Pair 1", "Pair 2", and "Pair 3" must be acquired at a deviation of one second or less. When the information collection time points of the information collection time point 710 in the entries of the copy pair configuration information table 408 for which the copy pair ID 701 is "Pair 1", "Pair 2", and "Pair 3" are checked, it is clear that the difference between these time points is 2 ms, which is one second or less. This signifies that the difference between the information acquisition time points of the respective resources is the configured acceptable time or less. This makes it possible to appropriately determine whether or not the difference between the information acquisition time points of the respective resources is the configured acceptable time or less.

A case in which the result of this determination is that the difference between the information acquisition time points at which the information of the respective resources in the resource group was acquired is the acceptable time or less (Step S1501: Yes) signifies that the acquired information is appropriate, and as such, the information collection management program 406 ends the time point check and correction process.

Alternatively, a case in which the difference between the information acquisition time points at which the information of the respective resources in the resource group was acquired is not the acceptable time or less (Step S1501: No) signifies that the acquired information is not appropriate, and as such, the information collection management program 406 displays a warning screen shown in FIG. 16 to warn the administrator. This makes it possible for the administrator to appropriately discern the fact that the difference between the information acquisition time points of multiple resources in the same resource group is not the acceptable time or less.

The warning screen, as shown in FIG. 16, includes a message display area 1601, resource information display areas (1602 through 1605), a reacquire button 1606, and a cancel button 1607. In the example shown in FIG. 16, the message display area 1601 displays a message to the effect that the difference between the time points at which the information was acquired exceeds an acceptable range (acceptable time). The method for displaying the message is not limited to this method.

The resource information display areas include a group ID display area 1602, a measured value display area 1603, an acceptable range display area 1604, and an acquisition start time point display area 1605. The ID of a resource group is displayed in the group ID display area 1602. The difference between the actual information acquisition time points calculated in Step S1501 (measured value) is displayed in the measured value display area 1603. The acceptable time of the acceptable time 1003 in the information acquisition policy table 411 is displayed in the acceptable range display area 1604. The time point at which the acquisition of information from this resource groups started is displayed in the acquisition start time point display area 1605.

The reacquire button 1606 is for issuing an indication for reacquiring the resource information of the resource group. The cancel button 1607 is for issuing an indication for not reacquiring the resources of the resource group.

Returning to the explanation of FIG. 15, in Step S1503, the information acquisition management program 406 determines whether or not there was an indication for reacquiring the resource information of the resource group. In a case where the result is that there is not an indication for reacquiring the resource information of the resource group, that is, a case in which the cancel button 1607 of the warning screen has been pressed (Step S1503: No), the main information acquisition management program 406 ends the time point check and correction process.

Alternatively, in a case where there is an indication for reacquiring the resource information of the resource group, that is, a case in which the reacquire button 1606 of the warning screen has been pressed (Step S1503: Yes), the main information acquisition management program 406 executes an information reacquisition indication process with respect to the resources of the resource group for which a time difference exceeding the acceptable time occurred (Step S1504). This potentially makes it possible to bring the information acquisition time points of the resources in the same resource group closer to one another. The information reacquisition indication process, for example, may be the same processing as that of Step S1103, and, may be processing for adjusting the timing of information acquisition by using information acquisition-related historical information shown in either FIG. 17A or FIG. 17B. Thereafter, the main information acquisition management program 406 acquires (collects) the information of the resources from each information acquisition management sub-program 406 (Step S1505).

In the time point check and correction process described hereinabove, in a case where the difference between the information acquisition time points at which the information of the resources in the resource group was acquired is not the acceptable time or less (Step S1501: No), the information collection management program 406 executes Steps S1502 and S1503, but the resource information of the resource group may be routinely reacquired without executing Steps S1502 and S1503.

Figure 17A:
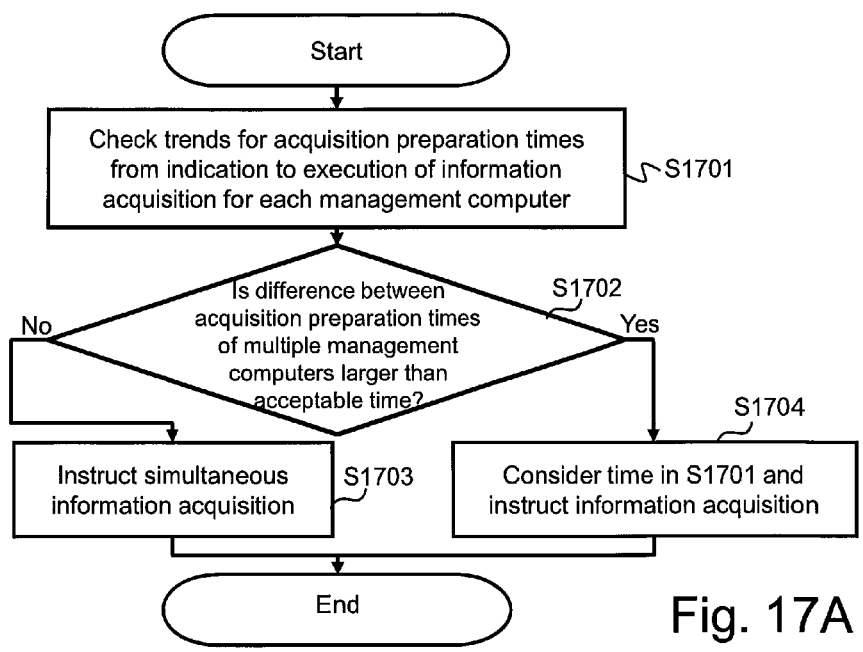
FIG. 17A is a flowchart showing an example of a first information reacquisition indication process related to Example 1.
Figure 17B:
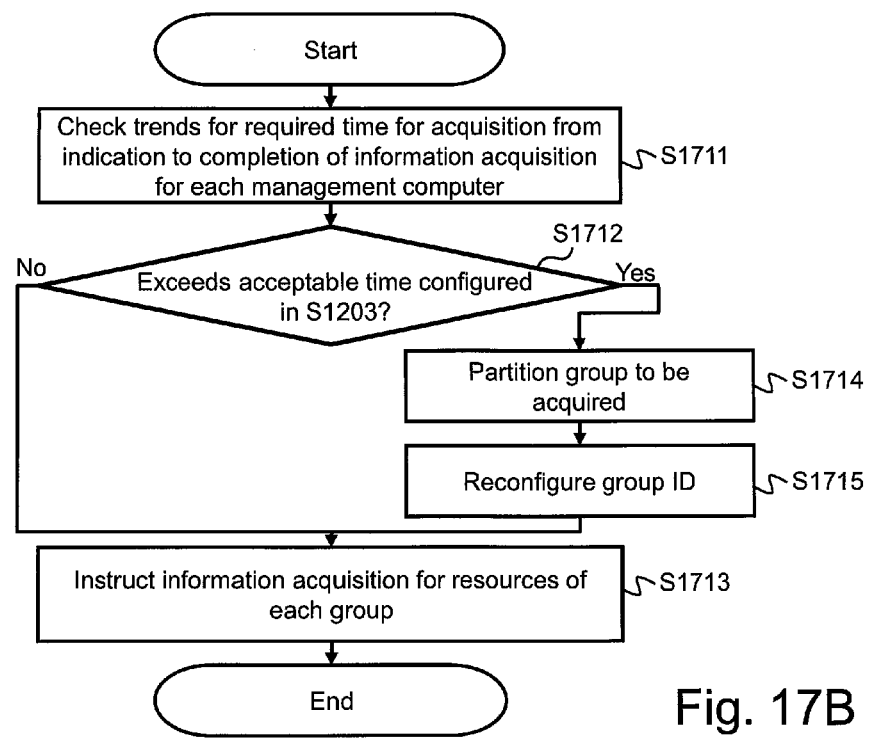
FIG. 17B is a flowchart showing an example of a second information reacquisition indication process related to Example 1.

FIG. 17A is a flowchart showing an example of a first information reacquisition indication process related to Example 1. FIG. 17B is a flowchart showing an example of a second information reacquisition indication process related to Example 1.

In the first information reacquisition indication process shown in FIG. 17A, in order to do away with a situation in which it takes time for any of the management computers 40, which have received an information acquisition indication from the main information collection management program 406, to execute information collection with respect to a target resource, and there is a deviation between the timings at which multiple management computers 40 start acquiring information with respect to resources of a resource group, the timings at which the information is acquired by the management computers 40 are corrected.

In the second information reacquisition indication process shown in FIG. 17B, in a case where the time it takes for a management computer 40, which has received the indication from the main information collection management program 406, to acquire the information exceeds the acceptable time, the resource group is partitioned so that the information acquisition time for each resource group falls within a prescribed time range.

The first information reacquisition indication process is executed in accordance with the CPU 402 of the management computer 40 executing the information collection management program 406. It is supposed that the main information collection management program 406 acquires from the information collection management sub-program 406 of each management computer 40 a period of time (acquisition preparation time) from when the information collection management sub-program 406 of each management computer 40 receives the main information collection management program 406 indication until the sub-program. 406 executes information acquisition, and retains historical information with respect to this acquisition preparation time.

In the first information reacquisition indication process, the main information collection management program. 406 checks for a trend in acquisition preparation time based on historical information with respect to the acquisition preparation times (Step S1701). For example, the main information collection management program 406 may use an average value of the acquisition preparation times as an acquisition preparation time, which will serve as a reference in each of the management computers 40. The main information collection management program 406 determines whether or not the difference between the reference acquisition preparation times of the multiple management computers 40 is larger than the acceptable time (Step S1702).

A case in which the result is that the difference between the reference acquisition preparation times is larger than the acceptable time (Step S1702: Yes) signifies that when the information acquisition indication is sent to the respective management computers 40 at the same time, it is highly likely that the times at which information acquisition is started in the respective management computers 40 will deviate more than the acceptable time, and that the result will be that the difference between the times at which information is acquired from the respective resources exceeds the acceptable time. As such, the main information collection management program 406, in order to bridge the gap between the reference acquisition preparation times of the respective management computers 40, sends the information acquisition indication to each management computer 40, considering the difference between the relevant reference acquisition preparation times (Step S1704). Information on the timing at which the information acquisition indication is sent to each management computer 40 is stored in the management computer 40 memory 404, and when acquiring resource information from the same resource group, the main information collection management program 406 adjusts the timing at which the information acquisition indication is sent to each management computer 40 based on this timing information.

It is supposed here, for example, that when the main information collection management program 406 sends the information collection indication to a first management computer 40 and a second management computer at the same timing, it is clear that the first management computer 40 starts executing information acquisition immediately after receiving the information acquisition indication, and that there was a tendency for the second management computer 40 to start executing information acquisition five minutes after receiving the information acquisition indication. In accordance with this, in Step S1704, the main information collection management program 406 sends the information acquisition indication to the second management computer 40 five minutes after sending the information acquisition indication to the first management computer 40. When the main information collection management program 406 adjusts the timings for sending the information acquisition indication sent to the management computers 40 like this, the management computers 40 execute information acquisition at approximately the same time points. As a result of this, it is possible to reduce the difference between the acquisition time points of the respective resource information acquired by the management computers 40. Thus, the difference between the acquisition times of the information acquired by the management computers 40 can be appropriately reduced by adjusting the timings of the information acquisition indications in accordance with a trend based on the past history.

Alternatively, a case in which the difference between the reference acquisition preparation times is equal to or less than the acceptable time (Step S1702: No) signifies that even when the information acquisition indication is sent to the respective management computers 40 at the same time, the difference between the times at which information acquisition is started in the respective management computers will be the acceptable time or less, and that there is little likelihood that the times at which the resource information is acquired will deviate and exceed the acceptable time. As such, the main information collection management program 406 sends the information acquisition indication to the management computers 40 at the same timing (Step S1703), and ends the processing.

The second information reacquisition indication process is executed in accordance with the CPU 402 of the management computer 40 executing the information collection management program 406. It is supposed that the main information collection management program 406 acquires from the information collection management sub-program 406 of each management computer 40 a period of time (time required for acquisition) from when the information collection management sub-program 406 of each management computer 40 receives the main information collection management program 406 indication until the sub-program 406 completes information acquisition for all the resources of one group, and retains historical information with respect to this time required for acquisition.

In the second information reacquisition indication process, the main information collection management program. 406 checks for a trend in the time required for acquisition based on historical information with respect to the time required for acquisition (Step S1711). For example, the main information collection management program 406 may use an average value of the time required for acquisition as an acquisition completion time, which will serve as a reference in the respective management computers 40.

The main information collection management program 406 determines whether or not the time required for acquisition exceeds the acceptable time (Step S1712). Since correction is unnecessary in a case where the result is that the time required for acquisition does not exceed the acceptable time (Step S1712: No), the main information collection management program 406 sends an information acquisition indication for each resource related to the group ID to the management computers 40 without making a correction (Step S1713).

Alternatively, since a correction is necessary in a case where the result is that the time required for acquisition exceeds the acceptable time (Step S1712: Yes), the main information collection management program 406 partitions the resource group for which the time required for acquisition checked in Step S1712 exceeds the acceptable time (Step S1714). For example, in a case where there is a large number of target resources in the resource group from which information is to be acquired at approximately the same time points, and, in addition, the acceptable time is short, there is the likelihood that the time required for acquisition will exceed the acceptable time. In accordance with this, the main information collection management program 406 references the configuration information table 407 for the relationship between the respective resources, and partitions a partitionable resource within the resource group to create a different resource group. For example, in a case where information with respect to a resource of a resource group was just barely able to be acquired within the acceptable time, from past trends it is possible to predict that when the number of target resources of the resource group is increased the time required for acquisition will exceed the acceptable time due to the increase in the number of resources. The main information collection management program 406 partitions the target resource of the resource group at this time. The main information collection management program 406 may allow the user to select the resource to be partitioned here, or may specify a resource whose relationship with other resources is slight, and allow the user to select whether or not this resource should be partitioned.

Next, the main information collection management program 406 configures a new group ID for the new resource group created in accordance with the partition (Step S1715). Since the target resources of the original resource group decrease, it becomes possible to collect the information within the acceptable time. Thereafter, in Step S1713, the main information collection management program 406 sends an information acquisition indication for each resource group to the other management computer 40 (Step S1713).

In the above explanation, the relationship of the configurations (resources) related to the storage subsystem 10 are managed by treating these related resources as a resource group, but, for example, resources may be treated as a resource group from the viewpoint of work. For example, using the application 307 of the host computer 30 as a reference, resources related to the related host computer 30, the related switch 20, and the related storage subsystem 10 may be regarded as a resource group. Doing so makes it possible to acquire application 307-related resource information, which consistently has approximately the same time points.

Figure 18:
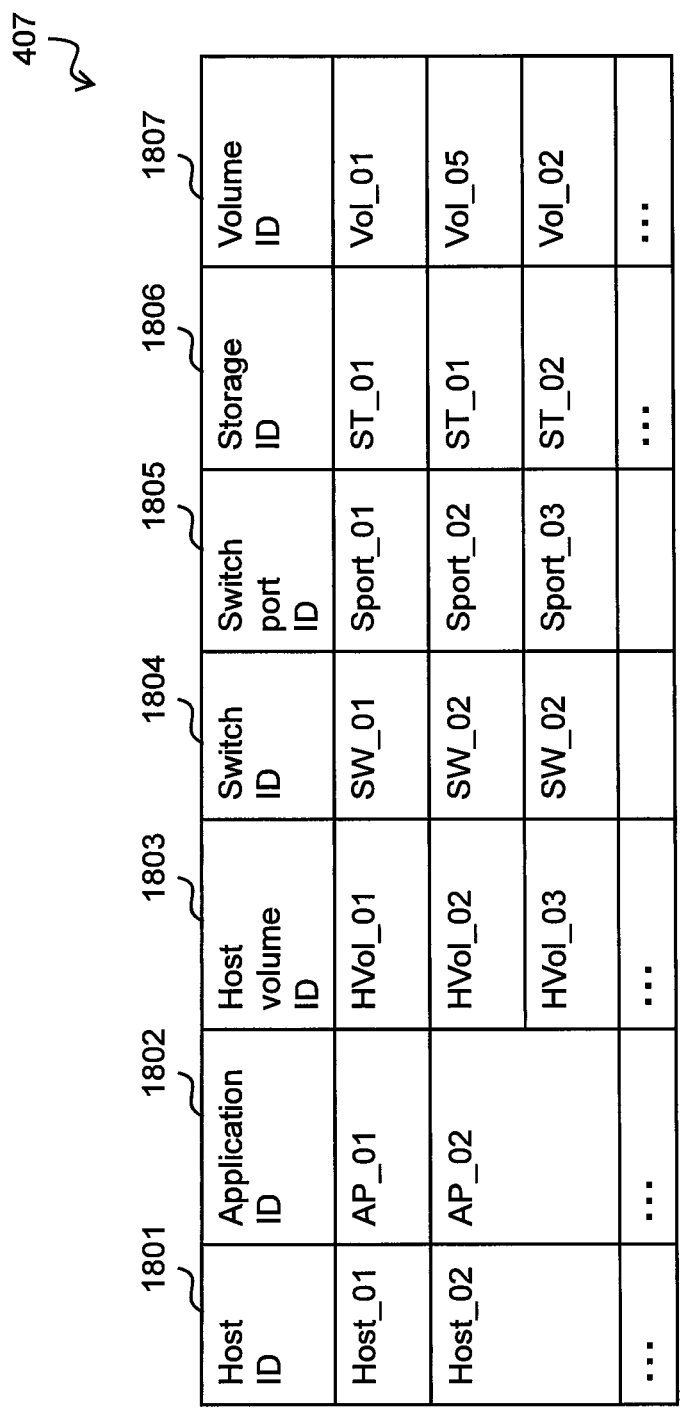
[FIG. 18]

FIG. 18 is a diagram showing another example of a configuration information table related to Example 1. FIG. 18 is a configuration information table which is traced from the application 307, that is, a configuration information table, which includes the configuration information of resources related to the application 307.

The configuration information table has columns of a host ID 1801, an application ID 1802, a host volume ID 1803, a switch ID 1804, a switch port ID 1805, a storage ID 1806, and a volume ID 1807 in each entry.

A host ID for identifying a host computer 30 on which an application 307 is running is stored in the host ID 1801. An application ID for identifying the application 307 is stored in the application ID 1802. The ID of a host volume, which the application 307 is using, is stored in the host volume ID 1803. A switch ID for identifying a switch 20 through which the host computer 30 on which the application 307 is running and a storage subsystem 10, which stores a volume in which data used by the application 307 is stored, is stored in the switch ID 1804. A switch port ID for identifying a port of the switch 20 is stored in the switch port ID 1805. A storage ID for identifying the storage subsystem 10 storing the volume is stored in the storage ID 1806. A volume ID for identifying the volume, which comprises the host volume, is stored in the volume ID 1807.

In Example 1 described hereinabove, for example, an application ID of the application ID 1802 in the configuration information table shown in FIG. 18 may be configured in the relationship ID 1002 of the information acquisition policy table 411. In accordance with this, the main information collection management program 406 exercises control so as to specify a resource corresponding to the application ID stored in the relationship ID 1002 of the information acquisition policy table 411 from the configuration information table shown in FIG. 18, and has the management computer 40 acquire the information of these resources.

EXAMPLE 2

Next, a computer system related to Example 2 will be explained.

The information acquisition indication process of the computer system related to Example 2 differs from that of the computer system related to Example 1.

In the computer system 1 related to Example 1, the main information collection management program 407 of the main management computer 40 sequentially sends a resource information acquisition indication to other management computers 40, and the management computers 40 receiving the information acquisition indication acquire information from the resource, and this could cause a bottleneck in the processing of the main information collection management program 407 of the main management computer 40, delaying the processing in the computer system.

In contrast to this, in the computer system related to Example 2, the management computer 40 automatically acquires information from resources in accordance with a schedule configured beforehand. Thus, each management computer 40 collects information autonomously, making it possible to prevent the processing by the main information collection management program 406 from becoming a bottleneck, and to enhance the processing efficiency of the computer system.

For example, the main management computer 40 related to Example 2 starts the information acquisition indication process with a polling interval as a trigger. The main information collection program 406 receives this trigger, and sends the management computer 40 an information acquisition indication, which includes a resource group for which information acquisition is required and a schedule for acquiring information from the resources of this resource group. The management computer 40, which receives the information acquisition indication, autonomously executes the collection of resource information from this resource group in line with the information acquisition indication schedule.

Next, the computer system related to Example 2 will be explained in detail. The computer system related to Example 2 constitutes the same configuration as the computer system related to Example 1 shown in FIGS. 1 through 10. Processing executed by the computer system related to Example 2, with the exception of the information acquisition indication process, is the same as the processing executed by the computer system related to Example 1, that is, the processing shown in FIG. 11, FIG. 12, and FIG. 15.

Figure 19:
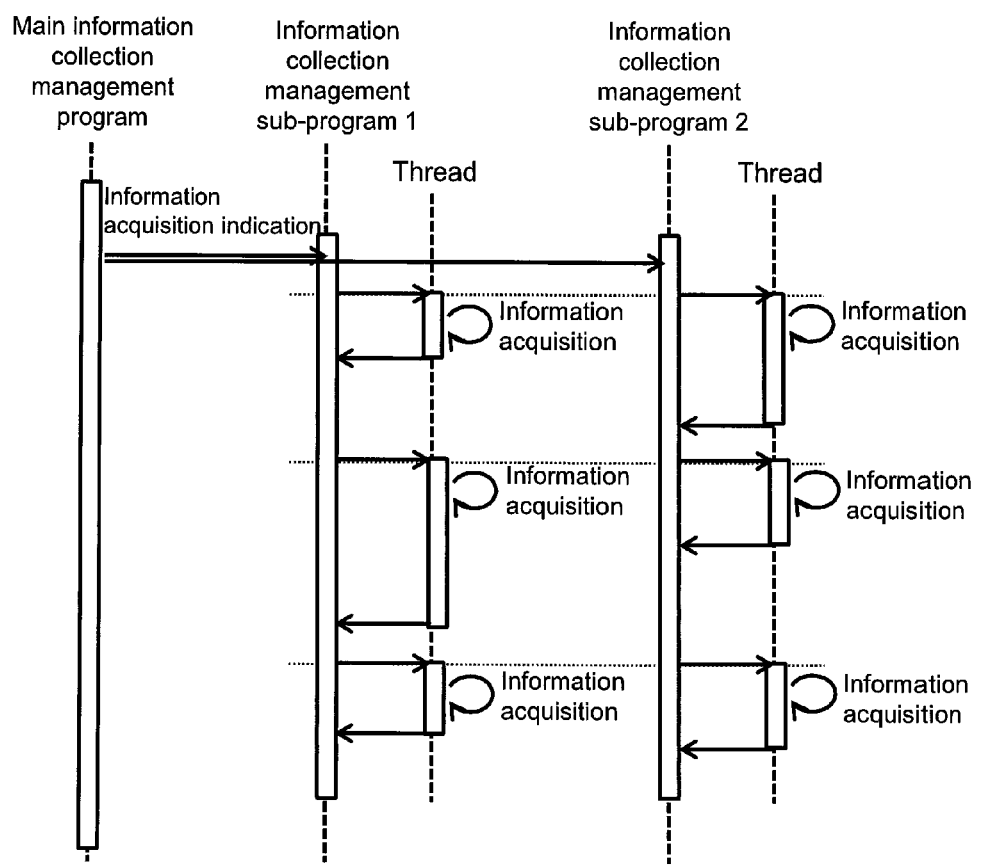
[FIG. 19]

FIG. 19 is a sequence diagram showing an example of the information acquisition indication process related to Example 2.

The execution of the information acquisition indication process is started by the main information acquisition management program 406 from the time point of the next information acquisition start time point 905 of the information acquisition schedule table 410.

The main information collection management program 406 specifies a resource group from the information acquisition policy table 411. For example, the information collection management program 406 specifies that the resource group for which the group ID 901 is "1" in the information acquisition policy table 411 is "Pair 1", "Pair 2", and "Pair 3" from the relationship ID 902.

In addition, since this information is copy pair information, the main information collection management program 406 specifies the volume ID of the volume related to the copy pair by referencing the volume ID 703 of the entry in which the copy pair ID 701 in the copy pair configuration information table 408 is "Pair 1", "Pair 2", and "Pair 3". Here, for example, the fact that the volume "Vol_01" is related to the copy pair "Pair 1" can be specified. In addition, the main information collection management program 406 specifies the entry, which includes "Pair_01" in the management target ID 2202 of the management target table 412, and specifies the fact that the ID of the management computer 40, which manages the volume of the copy pair "Pair_01", is "MS_01" based on the management computer ID 2201 of the relevant entry. Similarly, the main information collection management program 406 also specifies the fact that the management computer 40, which manages the volume of the copy pair "Pair3", is "MS_02".

In this example, the information collection apparatuses, which perform information collection, can be specified as being the management computers 40 "MS_01" and "MS_02". The main information collection management program 406 here may be the information collection management program 406 of "MS_01", may be the information collection management program 406 of the management computer 40 "MS_02", or may be the information collection management program 406 of a management computer 40 other than these management computers 40 "MS_01" and "MS_02".

Next, the main information collection management program 406 sends an indication (information acquisition indication) to each of the specified management computers 40 to acquire the information of multiple resources belonging to a single resource group. Information showing the time point at which the resource information of each resource group is to be acquired is included in the information acquisition indication here. For example, information to the effect that information acquisition for the resources "Pair 1", "Pair 2", and "Pair 3" of group ID "1" will start at "2012/05/20 16:01:00:00" is included in the information acquisition indication. Each management computer 40 (information collection management sub-program 406), which receives the information acquisition indication, stores the information showing the time point for acquiring a resource, which is stored in the information acquisition indication, in the memory 404.

Each management computer 40 references the memory 404, starts acquiring resource information from the configured resource group when the time point reaches the configured time point, and stores the acquired information in its own memory 404. Thus, in Example 2, since each management computer 40 autonomously starts acquisition and acquires resource information when the time point reaches the preconfigured time point, the deviations in the acquisition times of the resource information acquired by each management computer 40 can be appropriately reduced.

Information acquisition may be performed arbitrarily for a resource to which a group ID has not been assigned at a time when each management computer 40 is free. For this reason, the main information collection management program 406 need not designate a time point for acquiring information with respect to a resource to which a group ID has not been assigned.

In the example shown in FIG. 19, the management computers 40 do not notify the main information collection management program 406 of the acquired information immediately following the acquisition of the information, but, for example, may either actively send the acquired information to the main information collection management program 406 afterwards or in response to a request from the main information collection management program 406.

EXAMPLE 3

Next, a computer system related to Example 3 will be explained.

The information acquisition indication process of the computer system related to Example 3 differs from that of the computer system related to Example 1. The information acquisition indication process related to Example 3 can be used together with the information acquisition indication process of the computer system of either Example 1 or Example 2.

In the computer systems related to Example 1 and Example 2, the information acquisition indication process is performed having a prescribed polling interval as the trigger, but the computer system related to Example 3 performs the information acquisition indication process having the occurrence of a prescribed event as the trigger. For example, the computer system related to Example 3 may execute the information acquisition indication process for acquiring resource information related to the application 307 of the host computer 30 having a Job-executed action of this application as the trigger, or may execute the information acquisition indication process for acquiring resource information of a resource group related to the resource having an action, which has been changed by the configuration and state of the resource as the trigger. This makes it possible to appropriately acquire resource information, which must be understood, when an action occurs. In addition, since the resource information is acquired at the required timing, information can be acquired more efficiently than when acquiring information at each polling interval.

Next, the computer system related to Example 3 will be explained in detail. The computer system related to Example 3 constitutes the same configuration as the computer system related to Example 1 shown in FIGS. 1 through 10. The processing executed by the computer system related to Example 3, with the exception of the information acquisition indication process, is the same as the processing executed by the computer system related to Example 1, that is, the processing shown in FIG. 11, FIG. 12, and FIG. 15. Furthermore, the information collection setting screen in the information collection setting information acquisition process shown in FIG. 12 differs from the information collection setting screen of Example 1.

Figure 21:
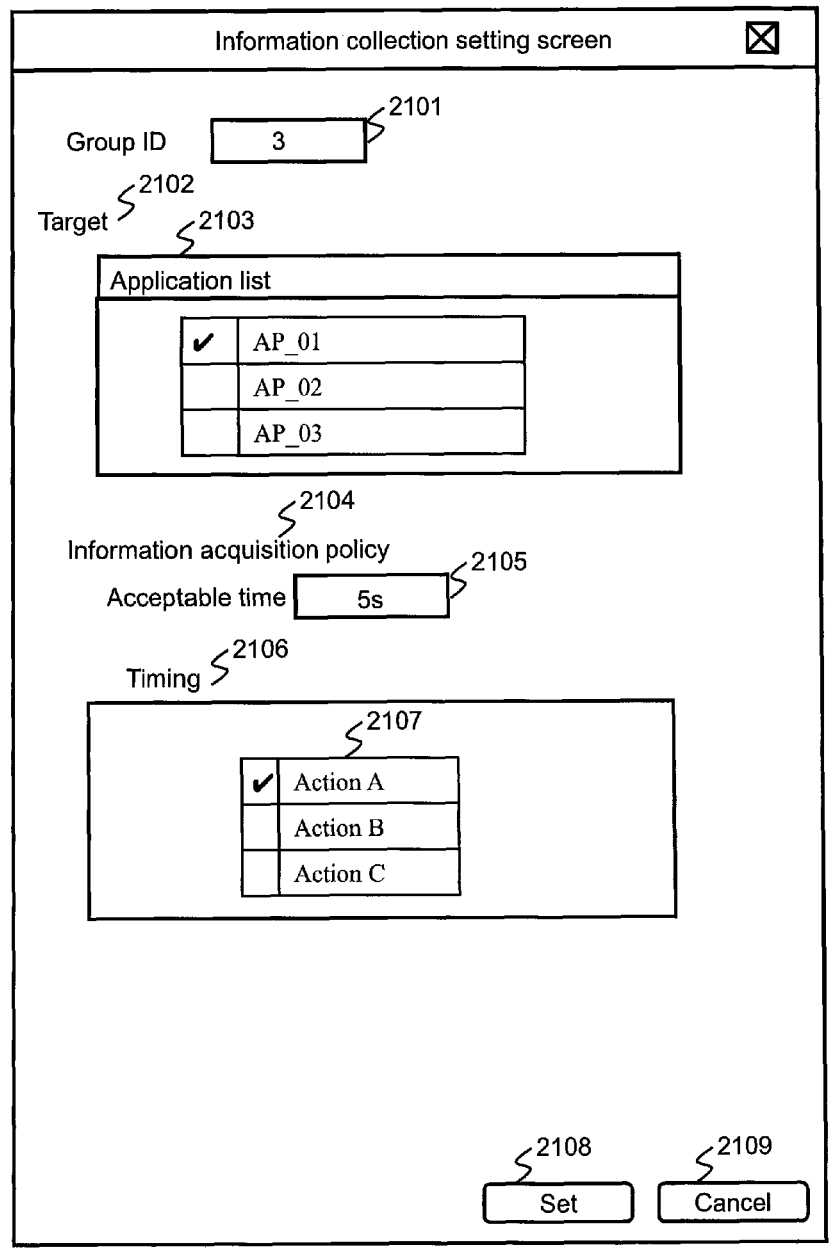
[FIG. 21]

FIG. 21 is a diagram showing an example of the information collection setting screen related to Example 3.

The information collection setting screen related to this example includes a group ID display field 2101 for displaying a group ID showing the resource group for which information will be acquired at approximately the same time point, a target designation area 2102 for designating a resource group target, an information acquisition policy designation area 2104 for designating a policy related to the acquisition of information with respect to the resource group, a timing designation area 2106 for configuring a timing for issuing a notification to the main information collection management program 406, a set button 2108, and a cancel button 2109.

An application list 2103, which selectably displays applications targeted as resource groups, is displayed in the target designation area 2102. The application list 2103 includes an application ID, which is stored in the application ID 1802 of the information configuration table of FIG. 18, and a checkbox for designating whether or not the application of this application ID is selected as a resource group. The administrator can select an application as a resource group by using the input device 400 to click on a checkbox. The resources related to an application for which a selection mark has been configured in the checkbox belong to the same resource group, that is, are resources targeted for acquiring information at approximately the same time point. In the example of FIG. 21, a resource related to application "AP_01", that is, the multiple resources associated via the entry corresponding to "AP_01" of the information configuration table of FIG. 18, belong to the same resource group.

The information acquisition policy setting area 2104 is an area for configuring a policy related to the acquisition of information with respect to a resource group. In the example of FIG. 21, the information acquisition policy setting area 2104 includes an acceptable time setting area 2105 for configuring a policy for a period of time (acceptable time), which is acceptable as the deviation for the information acquisition times when acquiring information related to the resources of a resource group. Furthermore, the acceptable time configured in the acceptable time setting area 2105 is stored in the information acquisition policy table 411. In the example of FIG. 21, the information acquisition time for the resources of the resource group is designated as being one second or less.

An action list 2107, which selectably displays an action constituting a timing candidate, is displayed in the timing designation area 2106. A list of actions configured for the application, which has been selected in the target designation area 2102, is displayed in the action list 2107. An action configured for an application may be collected from the application by the main information acquisition management program 406, or may be registered beforehand by the administrator. In the example of FIG. 21, "Action A" is configured, the main information acquisition management program 406 is notified that an action has occurred at the timing at which the "AP_01" has executed the task "Action A", and processing for collecting the information of the resources related to "AP_01" is performed.

The configured action is not only the change of state in which the application task is executed as described hereinabove, but, for example, may also be a change of state related to a status, such as the state of a copy pair changing from pair to suspended, or a change of state from a normal state to a warning state, such as when the volume capacity exceeds a threshold.

The set button 2108 is the button, which is pressed when the contents configured in the information collection setting screen have been finalized. When the set button 2108 is pressed, the information collection management program 406 finalizes the settings, which have been inputted to the information collection setting screen, acquires the contents inputted to the information collection setting screen, and reflects these contents in the information acquisition policy table 411. The cancel button 2109 is the button, which is pressed when canceling the contents configured in the information collection setting screen. When the cancel button 2109 is pressed, the information collection management program 406 ends the information collection setting information acquisition process without acquiring the contents configured in the information collection setting screen. Furthermore, when an application is designated in this information collection setting screen, the resources related to this application are regarded as a resource group, but, for example, arbitrary resources designated by the user may also be regarded as the same resource group.

Figure 20:
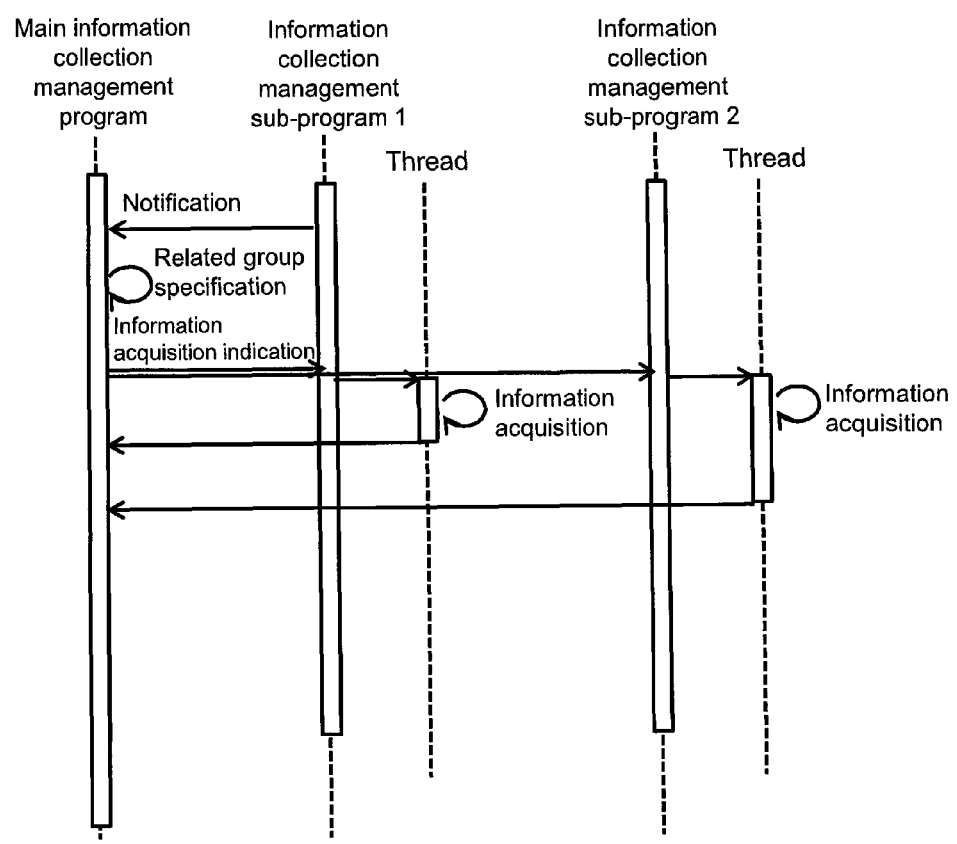
[FIG. 20]

FIG. 20 is a sequence diagram showing an example of an information acquisition indication process related to Example 3.

Prior to executing the information acquisition indication process, an action showing a certain change of state must be associated with a resource regarding which information is to be acquired when this action occurs. In this example, a designation of a related action and a resource is received in the information collection setting screen shown in FIG. 21, and this action and resource are associated.

In addition, the main information acquisition management program 406 is configured such that a notification is issued to the information collection management program 406 regarding the occurrence of an action when a state changes with respect to the management target. In the example of FIG. 21, the management target is configured so that when application "AP_01 is a state that the task "Action A" is executed, the information collection management program 406 is notified of information, which enables the application "AP_01" to be uniquely specified, and to the effect that "Action A" has been executed. Information enabling the "AP_01" to be uniquely specified is information, which enables the specification of the corresponding entry from the configuration information table of FIG. 18, and, for example, is a combination of the host ID and the application ID.

Each management computer 40 receives a notification of the occurrence of a prescribed action from the management target apparatus. This occurrence notification includes information enabling the unique specification of the resource, which issued the notification, and content showing a change of state in the management target. As the content showing the change of state in the management target, the management target and the information collection program 406 may be associated with a common ID and manage content showing the change of state, and may include the ID corresponding to the content showing the change of state in the occurrence notification.

Next, the management computer 40 notifies the main information collection management program 406 of the fact that an action occurrence notification has been received. Upon receiving this notification, the main information acquisition management program 406 starts the information acquisition indication process.

The main information collection management program 406 specifies a resource, which will constitute the source of the notification, and specifies a resource for which information must be acquired at the same time point, from the information acquisition policy table 411. Here, for example, in a case where the resource group having the group ID "1" is associated as the related resource with an event, which has occurred, the main information collection management program 406 references the resource group having the group ID 901 of "3" in the information acquisition policy table 411, and, based on the relationship ID 902, specifies that the resource is "AP_01".

In addition, the main information collection management program 406 references the entry in which the application ID 701 in the configuration information table shown in FIG. 18 is "AP_01". In accordance with this, the main information collection management program 406 can specify that the resource related to "AP_01" is related to the volume "HVol_01" of the host "Host_01", the port "Sport_01" of the switch "SW_01", and the volume "Vol_01" of the storage "ST_01". In addition, the main information collection management program 406 can specify, based on the management target ID 2202 in the management target table 412, that the management computer 40, which manages the "ST_01", is "MS_01", and that the management computer 40, which manages the "SW_01" and the "Host_01", is "MS_02".

In this example, it is possible to specify that the information collection apparatuses, which collect the information, are the management computers 40 "MS_01" and "MS_02". The main information collection management program 406 here may be the information collection management program 406 of the "MS_01", may be the information collection management program 406 of the management computer 40 "MS_02", or may be the information collection management program 406 of a management computer 40 other than these management computers 40 "MS_01" and "MS_02".

The main information collection management program 406 sends the specified management computers 40 an indication (information acquisition indication) for acquiring information on multiple resources belonging to a single resource group. The timing at which the main information collection management program 406 sends the information acquisition indication to the specified management computers 40 here is the timing configured for each management computer 40. Furthermore, in the initial state, the timing for sending the information acquisition indication to the management computers 40 is approximately the same timing, and in a case where the timing is corrected in Step S1105, is this corrected timing.

When the main information collection management program 406 sends an information acquisition indication like this, the management computers 40 acquire the resource information corresponding to the information acquisition indication, and send this information to the main information collection management program 406. Thereafter, the information collection management program 406 receives the information acquired in S1104 shown in FIG. 11, stores the information acquired by the management computers in the status (608, 709, and 806), and, in addition, stores the information acquisition time points sent from the management computers 40 in the information acquisition time point (609, 710, 807) of the configuration information table 407, the copy pair configuration information table 408, and the storage virtualization configuration information table 409.

In the example of FIG. 20, the management computers 40 send the acquired information to the main information collection management program 406 immediately after acquiring the information, but the present invention is not limited to this, and, for example, immediately after acquiring the information, the management computers 40 may send only an information acquisition notification showing that the information has been acquired without notifying the main information collection management program 406 of the acquired information, and, in addition, the management computers 40 may retain the acquired information and send the acquired information to the main information collection management program 406 afterwards.

A number of examples have been explained hereinabove, but needless to say the present invention is not limited to these examples, and various changes are possible without departing from the gist thereof.

For example, in Examples 1 through 3 described hereinabove, the management computer 40 was given as an example of the information acquisition apparatus, but the present invention is not limited thereto, and, for example, an apparatus (a storage subsystem 10, a switch 20, a host computer 30, and so forth), which has one or more resources of its own, may be the information acquisition apparatus. In accordance with this, a program (the storage microprogram 116 of the storage subsystem 10, the agent 309 of the host computer 30, and the agent 205 of the switch 20) in the apparatus constituting the information acquisition apparatus may execute the processing required as the information acquisition apparatus, which was executed by the management computer 40.

For example, in the case of S1501: No in FIG. 15, S1504 may be performed without performing S1502, or without performing S1502 and S1503.

REFERENCE SIGNS LIST

1 Computer system
10, 10A, 10B Storage subsystem
30 Host computer
40 Management computer

The invention claimed is:

1. A management system, which manages information acquisition for a plurality of resources, comprising:
a plurality of information acquisition apparatuses, each configured to independently acquire information on one or more of the resources;
a storage device; and
a control device coupled to the storage device, and to the information acquisition apparatuses,
wherein the storage device stores information specifying a resource group, which is a group of the resources targeted for acquiring information at approximately the same time points,
wherein the control device is configured to:
send to each of the information acquisition apparatuses, which are configured to acquire information on the resources of the specified resource group, an information acquisition indication which defines a timing for acquiring information from the resources of the specified resource group so that the information from the resources of the specified resource group is acquired at approximately the same time points,
determine whether or not differences between information acquisition time points of the resources of the specified resource group from the information acquisition apparatuses are each within a prescribed acceptable deviation, and
in a case where one or more of the differences are not within the prescribed acceptable deviation, adjust a timing at which the information acquisition indication is sent to the information acquisition apparatuses so as to reduce the difference between the information acquisition time points of the resources of the specified resource group.

2. A management system according to claim 1, wherein in a case where there is a time difference between the information acquisition apparatuses in acquisition preparation times from receipt of the information acquisition indication until the acquisition of information from the resources is actually started, the control device is configured to adjust the timing at which the information acquisition indications are sent to the information acquisition apparatuses so as to cancel a deviation in the time points at which information acquisition from the resources starts resulting from the time difference in the acquisition preparation times.

3. A management system according to claim 1, wherein the control device is configured to measure a time required for acquisition, which is a time required by the information acquisition apparatus to acquire information on the resources of the specified resource group, and in a case where the time required for acquisition is not within the prescribed acceptable deviation, the control device partitions the specified resource group into multiple resource groups.

4. A management system according to claim 1, wherein in a case where the difference between the information acquisition time points of the resources of the specified resource group is not within the prescribed acceptable deviation, the control device is configured to display a warning.

5. A management system according to claim 1, wherein in a case where the difference between the information acquisition time points of the resources of the specified resource group is not within the prescribed acceptable deviation, the control device is configured to re-execute the acquisition of information on the resources of the specified resource group.

6. A management system according to claim 1, wherein the information acquisition apparatus is configured to start to acquire information on the resource of the specified resource group upon receiving the information acquisition indication.

7. A management system according to claim 1, wherein the information acquisition indication includes time point information defining a time point for acquiring the resources, and the information acquisition apparatus is configured to start to acquire information on the resources of the specified resource group when the time point corresponds to the time point information of the information acquisition indication.

8. A management system according to claim 1, wherein the control device executes processing for sending the information acquisition indications to the information acquisition apparatuses on a regular basis.

9. A management system according to claim 1, wherein upon detecting the occurrence of a prescribed action, the control device is configured to specify a resource group related to the event, and regard the resource group related to the event as the specified resource group.

10. A management system according to claim 1, wherein the resource group has been designated by a user.

11. A management system according to claim 1,
wherein one or more of the resources is one or more storage subsystems having multiple logical volumes, and
wherein the resource group includes the resources related to a copy pair of the storage subsystems.

12. A management system according to claim 1, wherein the resource group includes resources related to an application executed on a host computer.

13. A method for managing information acquisition for a plurality of resources, the method comprising:
configuring a plurality of information acquisition apparatuses to independently acquire information on one or more of the resources;
storing information specifying a resource group, which is a group of the resources targeted for acquiring information at approximately the same time points;
sending to each of the information acquisition apparatuses, which are configured to acquire information on the resources of the specified resource group, an information acquisition indication which defines a timing for acquiring information from the resources of the specified resource group so that the information from the resources of the specified resource group is acquired at approximately the same time points;
determining whether or not differences between information acquisition time points of the resources of the specified resource group from the information acquisition apparatuses are each within a prescribed acceptable deviation, and
in a case where one or more of the differences are not within the prescribed acceptable deviation, adjusting a timing at which the information acquisition indication is sent to the information acquisition apparatuses so as to reduce the difference between the information acquisition time points of the resources of the specified resource group.

* * * * *